United States Patent
Matsuyama et al.

(10) Patent No.: US 9,150,745 B2
(45) Date of Patent: * Oct. 6, 2015

(54) INKJET INK, INK CARTRIDGE, INKJET RECORDING DEVICE, AND INKJET PRINTED MATTER

(71) Applicant: RICOH COMPANY, LTD., Tokyo (JP)

(72) Inventors: Akihiko Matsuyama, Shizuoka (JP); Mitsuru Naruse, Shizuoka (JP); Masayasu Nonogaki, Shizuoka (JP); Minoru Hakiri, Shizuoka (JP); Keita Katoh, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,367

(22) Filed: Aug. 23, 2013

(65) Prior Publication Data

US 2014/0072779 A1    Mar. 13, 2014

(30) Foreign Application Priority Data

Sep. 10, 2012 (JP) ................................. 2012-198956
Jul. 3, 2013 (JP) ................................. 2013-139476

(51) Int. Cl.
*C09D 11/322* (2014.01)
*C09D 11/326* (2014.01)

(52) U.S. Cl.
CPC ............ *C09D 11/326* (2013.01); *C09D 11/322* (2013.01); *Y10T 428/24802* (2015.01)

(58) Field of Classification Search
CPC ............................. C09D 11/322; C09D 11/326
USPC .................................. 106/31.77, 31.75, 31.86
See application file for complete search history.

(56) References Cited

U.S. PATENT DOCUMENTS

2004/0138337 A1    7/2004    Hasegawa et al.
2007/0197685 A1    8/2007    Aruga et al.
(Continued)

FOREIGN PATENT DOCUMENTS

CN    101023143 A    8/2007
CN    102203197 A    9/2011
(Continued)

OTHER PUBLICATIONS

Extended European Search Report issued Nov. 29, 2013 in Patent Application No. 13181196.0.
(Continued)

*Primary Examiner* — Helene Klemanski
(74) *Attorney, Agent, or Firm* — Oblon, McClelland, Maier & Neustadt, L.L.P.

(57) ABSTRACT

Inkjet ink contains a pigment, a hydrosoluble solvent, and water, wherein the pigment is represented by the following chemical formula 1 and has a CuKα X-ray diffraction spectrum having a wavelength of 1.541 Å such that no main peak is observed at a Bragg (2θ±0.2°) angle in a range of 2θ of from 28.0° to 29.0°, Chemical formula 1

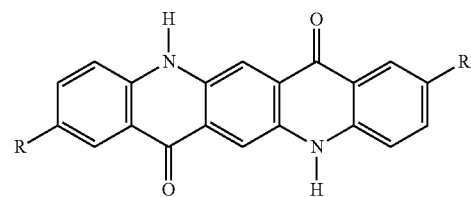

wherein R represents a hydrogen atom, a methyl group, or a chlorine atom.

15 Claims, 5 Drawing Sheets

(56) References Cited

U.S. PATENT DOCUMENTS

| | | |
|---|---|---|
| 2009/0117349 A1* | 5/2009 | Saito et al. ............... 106/31.77 |
| 2010/0285287 A1 | 11/2010 | Matsuyama et al. |
| 2011/0057981 A1 | 3/2011 | Aruga et al. |
| 2011/0205288 A1 | 8/2011 | Matsuyama et al. |
| 2012/0050390 A1* | 3/2012 | Nishimura ................. 347/21 |
| 2012/0098883 A1* | 4/2012 | Matsuyama et al. ........ 347/21 |
| 2012/0207983 A1* | 8/2012 | Matsuyama et al. ....... 106/31.43 |
| 2012/0242741 A1 | 9/2012 | Hasegawa et al. |
| 2012/0262517 A1* | 10/2012 | Takaku et al. ............. 347/20 |
| 2012/0328854 A1 | 12/2012 | Matsuyama et al. |
| 2013/0002776 A1* | 1/2013 | Nagashima et al. ........ 347/100 |
| 2013/0065028 A1 | 3/2013 | Fujii et al. |
| 2013/0071637 A1* | 3/2013 | Matsuyama et al. ....... 428/207 |
| 2013/0113860 A1* | 5/2013 | Gotou et al. .............. 347/20 |
| 2013/0155145 A1* | 6/2013 | Gotou et al. .............. 347/21 |
| 2013/0176369 A1* | 7/2013 | Gotou et al. .............. 347/100 |
| 2013/0194343 A1* | 8/2013 | Yokohama et al. ......... 347/20 |
| 2013/0194344 A1* | 8/2013 | Yokohama et al. ......... 347/20 |
| 2013/0323474 A1* | 12/2013 | Gotou et al. ............. 428/195.1 |
| 2014/0002539 A1* | 1/2014 | Goto et al. ............... 106/31.75 |
| 2014/0017461 A1* | 1/2014 | Matsuyama ............... 106/31.77 |
| 2014/0069295 A1* | 3/2014 | Fujii et al. ............... 106/31.75 |

FOREIGN PATENT DOCUMENTS

| | | |
|---|---|---|
| EP | 1 416 020 A1 | 5/2004 |
| EP | 2 570 461 A2 | 3/2013 |
| JP | 2003-003110 | 1/2003 |
| JP | 2007-056175 | 3/2007 |
| JP | 2009-108197 | 5/2009 |
| JP | 2012-046672 | 3/2012 |
| WO | WO 2012/018098 A1 * | 2/2012 |
| WO | WO 2012/124790 A1 * | 9/2012 |

OTHER PUBLICATIONS

U.S. Appl. No. 13/940,623, filed Jul. 12, 2013, Matsuyama.
U.S. Appl. No. 13/913,626, filed Jun. 10, 2013, Matsuyama.
Combined Chinese Office Action and Search Report issued Sep. 22, 2014 in Patent Application No. 201310409283.0 (with English translation of categories of cited documents).

* cited by examiner

INKJET INK, INK CARTRIDGE, INKJET RECORDING DEVICE, AND INKJET PRINTED MATTER

CROSS-REFERENCE TO RELATED APPLICATIONS

This patent application is based on and claims priority pursuant to 35 U.S.C. §119 to Japanese Patent Application Nos. 2012-198956 and 2013-139476, filed on Sep. 10, 2012 and Jul. 3, 2013, respectively, in the Japan Patent Office, the entire disclosures of which are hereby incorporated by reference herein.

BACKGROUND

1. Technical Field

The present invention relates to inkjet ink and an ink cartridge, an ink jet recording device, and inkjet printed matter that use the inkjet ink.

2. Background Art

Inkjet printers are widely used due to their advantages such as low noise and low running costs, and many printers capable of printing color images on plain paper are now widely available on market.

However, it is extremely difficult to satisfy all the properties required of images produced using such printers, such as good color reproducibility, abrasion resistance, durability, light resistance, drying property, feathering, color bleed, duplex printing, and ink discharging stability. As a result, the ink used is selected based on the particular application.

In general, the ink used in inkjet recording is mainly composed of water, with a colorant and a hydrosoluble solvent such as glycerin added to prevent clogging.

As the colorant, dyes are widely used for their coloring and stability. However, the light resistance and water resistance of images produced using such dye-based ink are inferior. Water resistance can be improved in some degree by using specialized recording media having an ink absorbing layer, but is not satisfactory at all when it comes to plain paper.

To compensate for such defects, ink using a pigment as a colorant (pigment ink) has begun to be widely used.

Although pigment ink is successful and superior to dye ink with regard to light resistance, water resistance, etc., the coloring of the pigment ink is degraded by coherence of beams of light having different wavelengths and phases produced by multiple reflections of the beams of light within the pigment. For this reason, pigment ink is considered to be inferior to dye ink in general with regard to the coloring.

In an attempt to compensate for such degradation of the coloring of the pigment ink, pigment particulates that are coated with a resin are used.

By this coating, the fixability and the gas resistance of the pigment ink are further improved and the dispersion stability thereof also ameliorates.

However, currently, even such pigment ink is not still on a par with dye ink with regard to gloss.

In addition, JP-2003-003110-A describes quality recording with a high color density exhibiting fineness and high saturation by using a pseudo-unidimensional crystalline organic color pigment as a colorant, which has an X-ray diffraction spectrum having a diffraction line showing the maximum intensity and its n-th order ("n" is an integer of 2 or greater) diffraction lines as main peaks.

SUMMARY

The present invention provides inkjet ink containing a pigment, a hydrosoluble solvent, and water, wherein the pigment is represented by the following chemical formula 1 and has a CuKα X-ray diffraction spectrum having a wavelength of 1.541 Å such that no main peak is observed at a Bragg (2θ±0.2°) angle in a range of 2θ of from 28.0° to 29.0°,

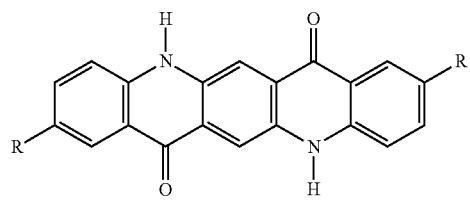

Chemical formula 1 wherein R represents a hydrogen atom, a methyl group, or a chlorine atom.

BRIEF DESCRIPTION OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
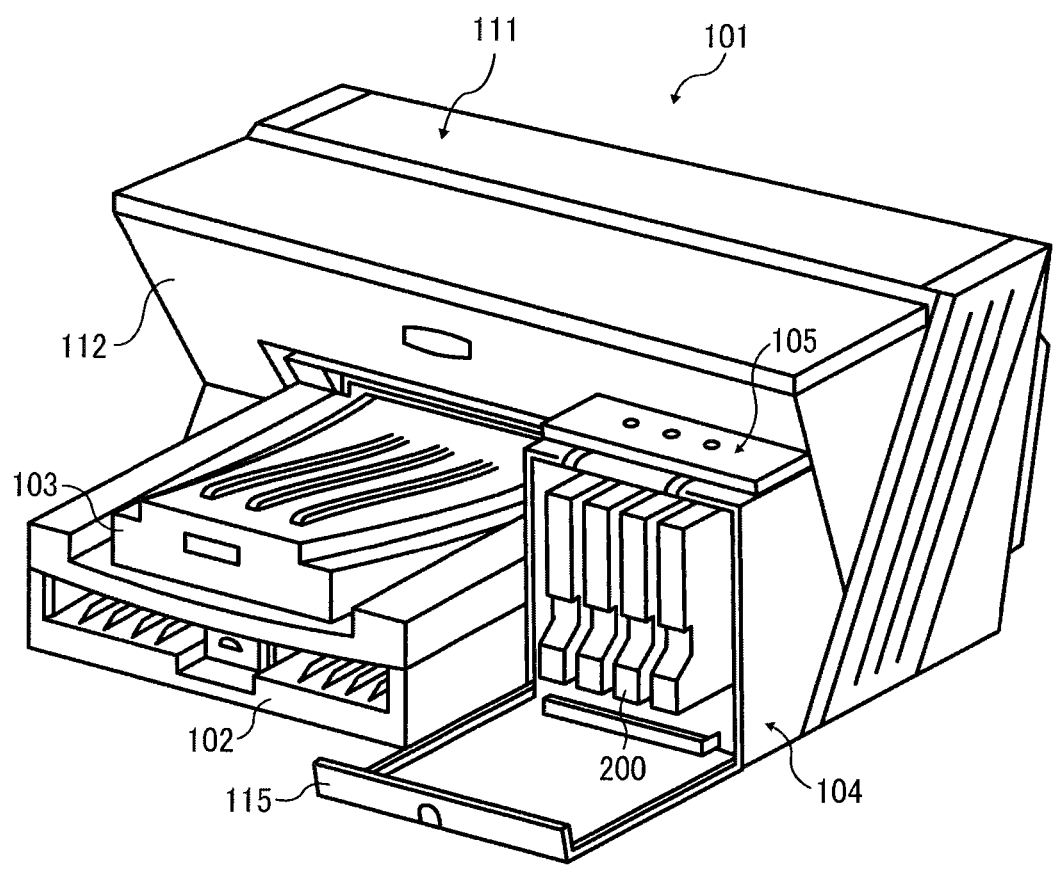
FIG. 1 is a perspective view illustrating an example of an inkjet recording device in which the cover of the ink cartridge installation unit is open.

The present disclosure provides:

1. inkjet ink that contains a pigment; a hydrosoluble solvent; and water, wherein the pigment is represented by the following chemical formula 1 and has a CuKα X-ray diffraction spectrum having a wavelength of 1.541 Å such that no main peak is observed at a Bragg (2θ±0.2°) angle in a range of 2θ of from 28.0° to 29.0°.

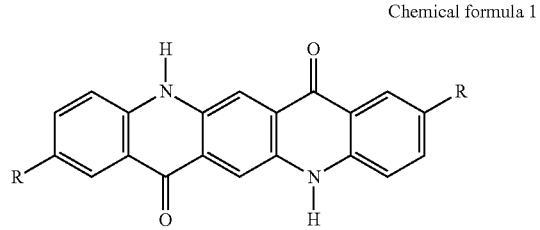

Chemical formula 1 wherein R represents a hydrogen atom, a methyl group, or a chlorine atom.

The inkjet ink is described in detail below and the present disclosure also includes the following 2 to 9, which are also described below.

2. The inkjet ink mentioned above, wherein the pigment satisfies the following relation 1:

$$0.000 \leq Y/X \leq 0.800 \quad \text{Relation 1}$$

where in a CuKα X-ray diffraction spectrum having a wavelength of 1.541 Å, X represents a peak intensity at a Bragg (2θ±0.2°) angle in a range of 2θ of from 5.5° to 6.0° and Y represents a peak intensity at a Bragg (2θ±0.2°) angle in a range of 2θ of from 26.5° to 27.5°.

3. The inkjet ink mentioned above, wherein the pigment has a volume average particle diameter of from 30 nm to 150 nm.

4. The inkjet ink mentioned above, further containing a dispersing agent represented by the following chemical formula 2:

$$A^1\text{-}O\text{—}B^1 \quad \text{Chemical formula 2}$$

where $A^1$ represents a linear or branched alkyl group having 8 to 12 carbon atoms, a β-naphtyl group, a styrenized phenolic group, or a distyrenized phenolic group and $B^1$ represents a $COOM^1$, an $SO_3M^1$, or a $PO_3M^1{}_2$, where $M^1$ represents Na, K, tetramethyl ammonium, or ethanol amine.

5. The inkjet ink mentioned above, further containing a dispersing agent represented by the following chemical formula 3:

Chemical formula 3

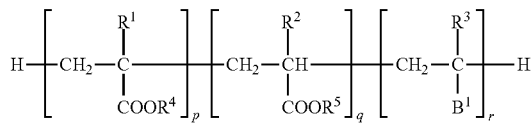

where $R^1$, $R^2$, and $R^3$ each, represent a hydrogen atom or a methyl group, $R^4$ and $R^5$ each, represent an $NH_2$ group, a benzyl group, and a stearyl group, $B^1$ represents a $COOM^1$ or an $SO_3M^1$, where $M^1$ represents Na, K, tetramethyl ammonium, or ethanol amine, and p, q, and r each, independently, represent an integer of from 5 to 50.

6. The inkjet ink mentioned above, wherein the hydrosoluble solvent is at least one of 3-ethyl-3-hydroxymethyl oxetane, isopropylidene glycerol, N,N-dimethyl-β-methoxy propionamide, and N,N-dimethyl-β-butoxy propionamide.

7. An ink cartridge including a container; and the inkjet ink mentioned above accommodated in the container.

8. An inkjet recording device including the ink cartridge mentioned above.

9. An inkjet printed matter containing a recording medium; and the inkjet ink mentioned above applied to the recording medium.

JP-2003-003110-A describes quality recording with a high color density exhibiting fineness and high saturation by using a pseudo-unidimensional crystalline organic color pigment as a colorant, which has an X-ray diffraction spectrum having a diffraction line showing the maximum intensity and its n-th order ("n" is an integer of 2 or greater) diffraction lines as main peaks.

The pseudo-unidimensional crystal means substantially having a periodicity along the one-axis direction, which is different from the pigment used in the present disclosure which has no diffraction peak at n=5 (diffraction angle 2θ of from 28° to 29°).

The pigment (hereinafter also referred to as pigment A) having a quinacridone skeleton represented by the chemical formula 1 exhibits excellent coloring and light resistance and has been widely used. However, being a pigment, this is inferior to a dye with regard to the coloring. Reducing the particle size of pigment is one of efforts to improve the coloring thereof. Although it is successful about improving the transparency, which contributes to improvement of gloss and coloring, it is not still satisfactory. In addition, it is possible to make the coloring of a pigment closer to that of a dye by reducing the crystallinity of the pigment. However, if a pigment loses crystallinity like a dye and becomes non-crystal, a problem of drastic degradation of the characteristics such as light resistance occurs, which is not preferable in terms of a practical use of such a pigment.

Considering these, the present inventors have found that the pigment A for the inkjet ink (hereinafter also referred to as ink) exhibits the same coloring power as a dye by reducing crystallinity while maintaining the crystalline structure of the pigment A to prevent degradation of the light resistance.

"reducing the crystallinity while maintaining the crystalline structure of the pigment A" means reducing an nth (n>1) peak intensity relatively to the first peak intensity in an X-ray diffraction spectrum. In the pigment A, it is suitable to reduce the peak intensity at a diffraction angle 2θ of from 28.0° to 29.0° or the peak intensity Y at a diffraction angle 2θ of from 26.5° to 27.5° against the intensity X of the first peak at a diffraction angle 2θ of from 5.5° to 6.0°. The coloring of the pigment A is improved by making no peak at a diffraction angle 2θ of from 28.0° to 29.0° or satisfying the relation 1: $0.000 \leq Y/X \leq 0.800$.

A method of reducing crystallinity while maintaining the crystalline structure of the pigment A is, for example, dissolving the pigment A in an acid or a solvent temporarily and placing the thus-obtained solution in a poor solvent for re-crystallization. In this method, to prevent crystals from growing excessively, the pigment is precipitated quickly in a small reaction field. However, in conventional methods, in which a solution of a pigment is dropped to a poor solvent being stirred, the size of a reaction field for precipitation is 1 cm or greater and the stirring speed is limited, which leads to crystals growing to large sizes. As a consequence, pigment particles having a reduced crystallinity are not formed.

However, a microreactor to precipitate dissolved pigments in minute reaction fields was developed recently, which makes it possible to precipitate pigment particles in minute reaction fields at a high speed while suppressing the growth of crystals.

The microreactor is a reaction device to conduct mixing and precipitation for chemical reaction or material production in a micro space having sides of 1 mm or less.

Specific examples thereof include, but are not limited to, mikroSyn (manufactured by SIBATA SCIENTIFIC TECHNOLOGY LTD.) having minute pipes having a size of from 50 μm to 500 μm as a reaction field, MiChS System (manufactured by MiChS Co., Ltd.), and ULREA (manufactured by M Technique Co., Ltd.) having a forced ultra thin layer as a reaction field formed of a gap of from 1 μm to 30 μm between the two rotation disks.

In general, the efficiency of chemical reaction is determined by collision frequency and energy applied to the system. Since molecules and heat are not transferred far in a micro space, increasing the collision frequency of molecules and quick heat transfer are possible, which enables quick mixing, quick preparation, quick heat exchange, and quick diffusion.

Therefore, to prepare a pigment having a reduced crystallinity while maintaining the crystalline structure of the pigment, the reaction field is preferably 100 μm or less and more preferably 30 μm or less.

An acid or an organic solvent is used to dissolve the pigment A. A strong acid such as strong sulfuric acid, hydrochloric acid, and nitric acid can be used. Strong sulfuric acid is particularly suitable in terms of solubility and dissolves the pigment A at a concentration of from 3% by weight to 5% by weight.

Specific examples of the organic solvent include, bur are not limited to, dimethyl sulfoxide, 1-methyl-2-pyrrolidinone, 1,3-dimethyl-2-imidazolidinone, N,N-dimethyl formamide, and N,N-dimethyl acetamide. Dimethyl sulfoxide is suitable in particular.

However, since the pigment A has a solubility of 1% by weight or less at room temperature and normal pressure, strong sulfuric acid is preferable to dissolve the pigment A. The temperature of the pigment solution can be raised to the boiling point of the dissolved acid or organic solvent at highest to increase the solubility.

Specific examples of the poor solvent include, but are not limited to, water, methanol, ethanol, isopropanol, or liquid mixture in which methanol, ethanol, and/or isopropanol is dissolved in water. If a solvent containing water is cooled down to −20° C. to −50° C., the solvent may coagulate. Considering that the reaction is fast when the temperature difference between the pigment solution and the solvent is wide, it is preferable to use methanol, ethanol, or isopropanol that contains no water because it can be cooled down to lower temperatures.

The size and the crystallinity of pigment particles formed using a microreactor depend on the ratio the flow rate of the pigment solution to the flow rate of the poor solvent. The ratio of the flow rate (ml/minute) of the pigment solution to the flow rate (ml/minute) of the poor solvent is preferably from 0.005 to 0.5 and more preferably from 0.01 to 0.1. When the ratio is small, the reaction speed is high, meaning that the crystallinity of the pigment can be lowered. When the ratio is for example, 0.5 or less, pigment particles having low cyrstallinity can be formed. When the ratio is, for example, 0.005 or greater, it is easy to collect pigment particles from which solvents are removed.

Pigment particles that are dispersed in a liquid mixture of an acid and a poor solvent formed by a microreactor as described above are retrieved as a pigment paste after removing the acid and the solvent using a centrifugal followed by washing with deionized water several times.

Pigment

Specific examples of the pigment A for use in the present disclosure include, but are not limited to, the non-substituted C.I. Pigment Violet 19 represented by the following chemical formula 1-1, methyl-modified C.I. Pigment Red 122 represented by the following chemical formula 1-2, and chlorine-modified C.I. Pigment Red 202 represented by the following chemical formula 1-3.

Chemical formula 1-1

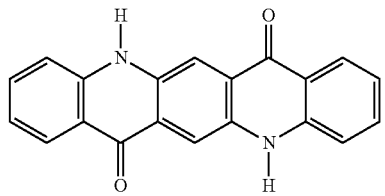

Chemical formula 1-2

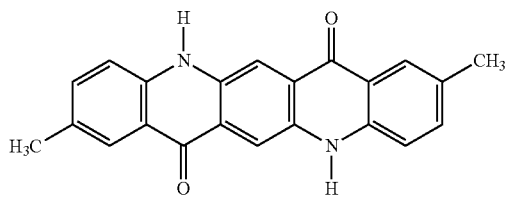

Chemical formula 1-3

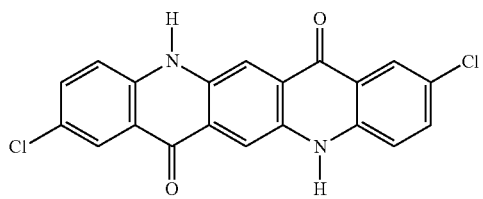

To obtain the ink satisfying the relation 1 described above, it is suitable to use pigment crystals having a smaller size than conventional pigments to lower the crystallinity of the pigment. As described above, this size reduction is made possible by a microreactor to precipitate dissolved pigment in minute reaction fields.

The pigment particle diameter dispersed in the ink of the present disclosure is preferably from 30 nm to 150 nm. The pigment particle diameter can be controlled within this range by using, for example, a mixing and kneading and dispersing machine using balls such as a bead mill or a ball mill, a mixing and kneading and dispersing machine using a shearing force such as a roll mill, or an ultrasonic dispersion machine. In the present disclosure, an ultrasonic dispersion machine is particularly suitable. When the pigment particle diameter is 30 nm or greater, the light resistance of the pigment is improved, thereby reducing the change in color. This is advantageous for a pigment. In addition, when the pigment particle diameter is, for example, 150 nm or less, image gloss becomes high so that it is possible to produce images with good saturation and brightness.

The concentration of a pigment in the ink is preferably from 1% by weight to 15% by weight, more preferably from 2% by weight to 12% by weight, and furthermore preferably from 3% by weight to 9% by weight. When the pigment density is 1% by weight or greater, coloring power becomes sufficient and images having a high saturation and a high image density are obtained. In addition, when the pigment density is 15% by weight, the ink is stabilized for a long period of time.

Dispersing Agent

In the present disclosure, it is suitable to use a dispersant (dispersing agent) when dispersing a pigment. There is no specific limit to the dispersing agent for use in the present disclosure. Any of the dispersing agents for use in preparation of the liquid dispersion of pigment can be suitably selected. Specific examples thereof include, but are not limited to, nonion surfactants such as polyoxyethylene isodecyl ether, polyoxyethylene lauryl ether, polyoxyethylene-β-naphtyl ether, polyoxy ethylene styryl phenyl ether, and polyoxy ethylene distyryl phenyl ether and anion surfactants such as polyoxyetheylene lauryl ether sulfate salts, polyoxyethylene-β-naphtyl ether sulfate salts, polyoxy ethylene styryl phenyl ether phosphorate salts, lauryl ether phosphorate salts, octyl ether carbonate salts, distyryl phenyl ether sulfate salts, styryl phenyl ether phosphorate salts, and β-naphtyl ether carbonate salts.

In the present disclosure, the dispersing agent represented by the chemical formula 2 or 3 illustrated above is particularly suitable. Such a dispersing agent can maintain the viscosity and the particle diameter of dispersed pigment A, thereby extremely stabilizing discharging of ink when used in an inkjet printer. The dispersing agent represented by the following chemical formula 3 illustrated above is obtained by copolymerizing acrylic monomers or methacrylic monomers.

Specific examples of the dispersing agents represented by the chemical formula 2 include, but are not limited to, the compounds represented by the chemical formula 2-1 to 2-4 shown in Table 1.

TABLE 1

| Chemical formula | $A^1$ | $B^1$ | $M^1$ |
|---|---|---|---|
| 2-1 | β-naphthyl | $COOM^1$ | Tetramethyl ammonium |
| 2-2 | Distyrenized phenol | $SO_3M^1$ | K |
| 2-3 | Linear alkyl (C = 12) | $PO_3M^1_2$ | Na |
| 2-4 | Styrenized phenol | $COOM^1$ | Ethanol amine |

Specific examples of the dispersing agents represented by the chemical formula 3 include, but are not limited to, the compounds represented by the chemical formula 3-1 to 3-3 shown in Table 2.

TABLE 2

| Chemical formula | $B^1$ | $M^1$ | $R^1$ | $R^2$ | $R^3$ | $R^4$ | $R^5$ | p | q | r |
|---|---|---|---|---|---|---|---|---|---|---|
| 3-1 | $COOM^1$ | Tetra methyl ammonium | H | $CH_3$ | $CH_3$ | Benzyl | Stearyl | 25 | 25 | 25 |
| 3-2 | $COOM^1$ | Ethanol amine | $CH_3$ | $CH_3$ | H | $NH_2$ | Benzyl | 25 | 5 | 50 |
| 3-3 | $SO_3M^1$ | K | $CH_3$ | $CH_3$ | H | Stearyl | $NH_2$ | 5 | 50 | 50 |

It is also possible to use polymer dispersing agents such as polyacrylic acids, polymethacrylic acids, copolymers of acrylic acid and acrylonitrile, copolymers of vinyl acetate and an acrylic acid ester, copolymers of acrylic acid and an acrylic acid alkyl ester, copolymers of styrene and acrylic acid, copolymers of styrene and methacrylic acid, copolymers of styrene, acrylic acid, and an acrylic acid alkyl ester, copolymers of styrene, methacrylic acid, and an acrylic acid alkyl ester, copolymers of styrene, α-methyl styrene, and an acrylic acid, copolymer of styrene, α-methyl styrene, and acrylic acid—copolymers of an acrylic acid alkyl ester, copolymers of styrene and maleic acid, copolymers of vinyl naphthalene and maleic acid, copolymers of vinyl acetate and ethylene, copolymers of vinyl acetate and aliphatic acid vinyl ethylene, copolymers of vinyl acetate and a maleic acid ester, copolymers of vinyl acetate and crotonic acid, copolymers of vinyl acetate and acrylic acid, copolymers of acryllic acid and silicone, and modified polyurethane resins.

These dispersing agents can be used alone or in combination.

A pigment dispersion element can be prepared by dissolving the dispersing agent mentioned above in an aqueous medium, adding the pigment to the solution followed by sufficient moistening, and mixing and kneading and dispersing the resultant by high speed stirring by a homogenizer, a disperser using balls such as a bead mill and a ball mill, a mixing and kneading disperser using a shearing force such as a roll mill, or an ultrasonic disperser.

However, after such a dispersion process, coarse particles are contained in most cases, which easily clog in the inkjet nozzle or the supplying route. Therefore, it is suitable to remove such coarse particles (e.g., particle diameter: 1 μm or greater) by a filter or a centrifugal.

In the present disclosure, the blending ratio of a dispersing agent to a pigment is preferably from 10% by weight to 100% by weight and more preferably from 20% by weight to 50% by weight. When the blending ratio is 10% by weight or greater, the pigment particles can be finely dispersed. When the blending ratio is 100% by weight or less, the dispersing agent is adsorbed to the surfaces of pigment particles effectively, thereby improving the preservability of ink so that bleed-free images can be printed. In addition, the content of the dispersed particulate in the ink is preferably from about 2% by weight to about 20% by weight and more preferably from 3% by weight to 15% by weight based on the total amount of the pigment and the dispersing agent.

Self-Dispersing Type Pigment

In the present disclosure, pigment particles having hydrophilicitized surfaces can be used. The surface of the pigment particle can be treated by a known method such as oxidation treatment, azo reaction, plasma treatment, etc. By the surface treatment, hydrophillic groups such as a carbonyl group, a carboxylic group, a hydroxyl group, or a sulfone group can be introduced into the surface of a pigment particle.

Polymer Coated Pigment Particle

To disperse pigments in an aqueous system, a method is known in which the pigments are encapsulated in polymer particulates. Specific examples of the polymers forming polymer emulsions include, but are not limited to, vinyl-based polymers, polyester-based polymers, and polyurethane-based polymers. In particular, the polymers specified in JP-2000-53897-A and JP-2001-139849-A can be suitably used. Among these, vinyl-based polymers and polyester-based polymers are preferable in particular.

Vinyl-Based Polymer

There is no specific limit to the vinyl-based polymer. For example, polymers formed of the following polymerizable monomers alone or in combination can be used.

These are: vinyl-based aromatic hydrocarbons such as styrene, o-methyl styrene, m-methyl styrene, p-methyl styrene, α-methyl styrene, p-ethyl styrene, 2,4-dimethyl styrene, p-tert-butyl styrene, p-chloro styrene, and divinyl benzene; (meth)acrylates such as methyl acrylate, ethyl acrylate, butyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, 2-ethylhexyl acrylate, cyclohexyl acrylate, hexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethyl hexyl methacrylate, hexyl methacrylate, octyl methacrylate, nonyl methacrylate, decyl methacrylate, undecyl methacrylate, and dodecyl methacrylate; unsaturated carboxylic acids such as acrylic acid, methacrylic acid, itaconic acid, and maleic acid; (meth)acrylic acmide, N-substituted maleimide, maleic anhydride, (meth)acrylonitrile, vinyl ketone, vinyl acetate, and vinylidene chloride.

Polyester-Based Polymer

Polyester-based polymers are made by a polycarboxylic acid and a polyalcohol.

Specific examples of the polycarboxylic acids include, but are not limited to, aromatic dicarboxylic acids such as terphthalic acid, isophthalic acid, orthophthalic acid, 1,5-npahthalene diacarboxylic acid, 2,6-naphthalene dicarboxylic acid, diphenic acid, sulfoterephthalic acid, 5-sulfoisophthalic acid, hexahydro phtalic anhydride, 4-sulfophthalic acid, 4-sulfonaphthalene-2,7-dicarboxylic acid, 5,[4-sulfophenoxy]isophthalic acid, and sulfoterephthalic acid; aliphatic dicarboxylic acids such as succinic acid, adipic acid, azelaic acid, sebacic acid, and dodecane dicarboxylic acid; aromatic oxy carboxylic acids, alicyclic dicarboxylic acids; and tri- or higher carboxylic acids.

Specific examples of the polyols include, but are not limited to, aliphatic polyols such as ethylene glycol, propylene glycol, 1,3-propane diol, 2,3-butane diol, 1,4-butane diol, 1,5-pentane diol, 1,6-hexane diol, neopenthyl glycol, diethylene glycol, dipropylene glycol, 2,2,4-trimethyl-1,3-pentane diol, polyethylene glycol, polypropylene glycol, polytetramethylene glycol, trimethylol ethane, trimethylol propane, glycerin, pentaerythritol, 1,4-cyclohexane diol, 1,4-cyclohexane dimethanol, spiroglycol, tricyclo decane diol, tricyclodecane dimetanol, methaxylene glycol, orthoxylene glycol, 1,4-phenylene glycol, bisphenol A, and lactone-based polyester polyols; alicyclic polyols and aromatic polyols.

Polymer Particulate

In the present disclosure, microcapsulation to coat organic pigment particles with hydrophilic polymers or emulsification of the organic pigment particles can be suitably employed for dispersion in an aqueous medium. Any known method can be employed to conduct the microcapsulation or emulsification. Such known methods are, for example, chemical manufacturing methods, physical manufacturing methods, physical-chemical manufacturing methods, mechanical manufacturing methods. Specific examples thereof include, but are not limited to, acid deposition methods, phase-transfer emulsification methods, interfacial polymerization methods, in-situ polymerization methods, submerged cured coated film methods, coacervation (phase separation) methods, solvent evaporation methods, fusion distribution cooling methods, air suspension coating methods, and spray drying methods.

Polymer particulates exhibit excellent water-dispersibility all the more by introducing an ionic group into the surface thereof. Specific examples of such ionic groups include, but are not limited to, a sulfonic group, a carboxylic group, a sulfate group, a phosphoric acid group, and a phosphine acid group, an alkali metal salt group or an ammonium basic group thereof, and a primary to tertiary amine group. Among these, a carboxylic alkali metal basic group, a carboxylic ammonium group, a sulphonic alkali metal basic group, and a sulphonic ammonium basic group are preferable and in particular, a sulphonic alkali metal basic group and a sulphonic ammonium basic group are preferable in terms of the aqueous dispersion stability. The ionic group is introduced by adding a monomer having an ionic group when synthesizing a resin. Specific examples of such salts include, but are not limited to, Li, Na, K, Mg, Ca, Cu, and Fe. Li, Na, and K are particularly preferable.

Hydrosoluble Solvent

The ink of the present disclosure is prepared by using water as a liquid medium. An hydrosoluble solvent is used in combination to prevent ink from drying, improve the dispersion stability, and prevent curling of plain paper. Specific examples of such hydrosoluble solvents include, but are not limited to, the following. These can be used alone or in combination.

Polyols such as ethylene glycol, diethylene glycol, triethylene glycol, tetraethylene glycol, polyethylene glycol, polypropylene glycol, dipolypropylene glycol, tripolypropylene glycol, polypropylene glycol, 1,3-butane diol, 3-methyl-1,3-butane diol, 1,5-pentane diol, 1,6-hexane diol, glycerin, isopropylidene glycerol, trimethylol ethane, trimethylol propane, 1,2,3-butane triol, 1,2,4-butane triol, 1,2,6-hexane triol, and petryol;

Polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Polyol aryl ethers such as ethylene glycol monophenyl ether and ethylene glycol monobenzyl ether;

Nitrogen-containing heterocyclic compounds such as 2-pyrrolidone, N-methyl-2-pyrrolidone, N-hydroxyethyl-2-pyrrolidone, 1,3-dimethylimidazoline, ε-caprolactam, and γ-butylolactone;

Amides such as formamide, N-methyl formamide, N,N-dimethyl formamide, N,N-dimethyl-β-methoxy propionamide, and N,N-dimethyl-β-butoxy propionamide;

Amines such as monoethanol amine, diethanol amine, triethanol amine, monoethyl amine, diethylamine, and triethyl amine;

Sulfur-containing compounds such as dimethyl sulfoxide, sulfolane, and thiodiethanol; 3-ethyl-3-hydroxymethyl oxetane, propylene carbonate, and ethylene carbonate.

Among these hydrosoluble solvents, 3-ethyl-3-hydroxymethyloxetane, isopropylidene glycerol, N,N-dimethyl-β-methoxy propionamide, and N,N-dimethyl-β-butoxy propionamide are preferable in particular.

These are excellent to prevent curling of plain paper.

The ink of the present disclosure optionally contains sugar groups. Such sugar groups serve as hydrosoluble agents and/or wetting agents. Specific examples of the sugar groups include, but are not limited to, monosaccharides, disaccharides, oligosaccharides (including trisaccharides and tetrasaccharides), and polysaccharides. Preferred specific examples thereof include, but are not limited to, glucose, mannose, fructose, ribose, xylose, arabinose, galactose, maltose, cellobiose, lactose, saccharose, trehalose, and maltotriose.

Polysaccharides represent sugar in a broad sense and contain materials that are present widely in nature, for example, α-cyclodextrine and cellulose.

Specific examples of derivatives of these sugar groups include, but are not limited to, reducing sugars, oxidized sugars, amino acid, and thio acid for the sugar groups specified above. Sugar alcohols are particularly preferable and specific examples thereof include, but are not limited to, maltitol and sorbit.

The blend ratio of the pigment and the hydrosoluble agent has a large impact on the discharging stability of ink discharged from a head. If the blending amount of the hydrosoluble agent is too small while the ratio of the solid pigment portion is high, water evaporation around ink meniscus of nozzles tends to be accelerated, resulting in poor discharging performance.

The blending ratio of the hydrosoluble agents is preferably from 10% by weight to 70% by weight and more preferably from 20% by weigh to 50% by weight based on the entire ink. The drying property, the preservability, and the reliability of ink are extremely good in this range.

Penetrating Agent

By adding a penetrating agent to ink, the surface tension lowers so that the ink filling property of the ink to the nozzles and the discharging stability ameliorate. In addition, since the ink droplets quickly penetrate into a recording medium after the ink droplets have landed thereon, feathering and color bleed are reduced.

Surfactants and solvents having a penetrating property are used as the penetrating agent.

Specific examples of the solvents having a penetrating property include, but are not limited to, polyols having eight or more carbon atoms such as 2-ethyl-1,3-hexane diol and 2,2,4-trimethyl-1,3-pentane diol and glycol ethers.

The surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surface active agents include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide, and perfluoro alkyl ether compounds. The fluorine-containing surfactant represented by the following Chemical formula 4 are more preferable.

Chemical formula 4

$$C_4F_9-CH_2CHCH_2O-(C_2H_4O)_{23}-CH_2CHCH_2-C_4F_9$$
$$\qquad\qquad\;\;|\qquad\qquad\qquad\qquad\qquad\;\;|$$
$$\qquad\qquad\;OH\qquad\qquad\qquad\qquad\qquad OH$$

Specific examples of the acetylene-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, all manufactured by AIR PRODUCTS and CHEMICALS, INC. (US)}. Among these, SURFYNOL® 104, 465, and TG are particularly good to demonstrate good printing quality.

These surfactants may be used alone or in combination.

The content of the penetrating agent to the entire ink is preferably from 0.01% by weight to 5% by weight, more preferably from 0.03% by weight to 2% by weight. When the content of the penetrating agent is too small, spreading of dots after printing tends to be poor, i.e., resulting in dots having reduced diameters so that filling-in in a solid image becomes bad, thereby degrading the image density and color saturation. When the content of the penetrating agent is too large, the ink tends to foam, which leads to clogging in the flowing path in the nozzle, resulting in prevention of discharging ink.

Known additives such as pH control agents, anti-septic and anti-fungal agents, anti-corrosion agents, anti-oxidants, ultraviolet absorbers, oxygen absorbers, light stabilizers, and antikogation agents can be optionally added to the ink of the present disclosure.

pH Control Agent

A pH control agent is optionally added to maintain the ink in the state of alkali, thereby stabilizing the dispersion state and ink discharging. However, when the pH is too high, the head of inkjet and an ink supplying unit tend to be dissolved easily, which results in modification, leakage, poor discharging performance of ink, etc.

It is more desirable to add a pH control agent when a pigment is mixed and kneaded and dispersed together with a dispersing agent in water than when additives such as a hydrosoluble solvent and a penetrating agent are added after mixing, kneading, and dispersing.

This is because such a pH control agent may break the dispersion.

It is preferable to use a pH control agent which contains at least one of an alcohol amine, an alkali metal hydroxide, ammonium hydroxide, a phosphonium hydroxide, and an alkali metal carbonate.

Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide.

Specific examples of the alkali metal carbonates include, but are not limited to, lithium carbonate, sodium carbonate, and potassium carbonate.

Anti-Septic and Anti-Fungal Agent

Specific examples of the anti-septic and anti-fungal agents include, but are not limited to, dehydrosodium acetate, sodium sorbinate, 2-pyridine thiol-1-oxide sodium, sodium benzoate, and pentachlorophenol sodium.

Anti-Corrosion Agent

Specific examples of the anti-corrosion agents include, but are not limited to, acid sulfite, thiosodium sulfate, ammonium thiodiglycolate, diisopropyl ammonium nitrite, pentaerythritol quaternary nitride, and dicyclohexyl ammonium nitrite.

Anti-Oxidant

Specific examples of the anti-oxidants include, but are not limited to, phenol-based anti-oxidants (including hindered phenol-based anti-oxidants), amine-based anti-oxidants, sulfur-based anti-oxidants, and phosphorous-based anti-oxidants.

Ultraviolet Absorber

Specific examples of the ultraviolet absorbers include, but are not limited to, benzophenone-based ultraviolet absorbents, benzotriazole-based ultraviolet absorbents, salicylate-based ultraviolet absorbents, cyanoacrylate-based ultraviolet absorbents, and nickel complex salt-based ultraviolet absorbents.

Anti-Kogation Agent

The ink of the present disclosure optionally contains an anti-kogation agent.

Kogation is a problematic phenomenon in which ink components modified upon application of heat by a heater adhere to the heater, which occurs to a thermal head that discharges ink by a foaming force thereof by instant heating upon application of an electric current to a heater.

Specific examples of the anti-kogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group or a methylene group and a carboxylic group.

Recording Device

The ink of the present disclosure can be applied to recording systems employing an inkjet recording system such as printers, facsimile machines, photocopiers, multi-functional machines (serving as a printer, a facsimile machine, and a photocopier) for inkjet recording in particular.

Inkjet recording devices, which were used in Examples described later, are described below.

The inkjet recording device 101 illustrated in FIG. 1 has a sheet feeder tray 102 placed in the inkjet recording device 101 to feed recording media, a discharging tray 103 installed in the inkjet recording device 101 to store the recording media on which images are recorded (formed), and an ink cartridge installation unit 104. On the upper surface of the ink cartridge installation unit 104 is arranged an operating portion 105 including operation keys, a display, etc. The ink cartridge installation unit 104 has a front cover 115 that is openable and closable to detach and attach an ink cartridge 200. 111 represents the upper cover of the recording device 101 and 112 represents the front surface thereof.

Figure 2:
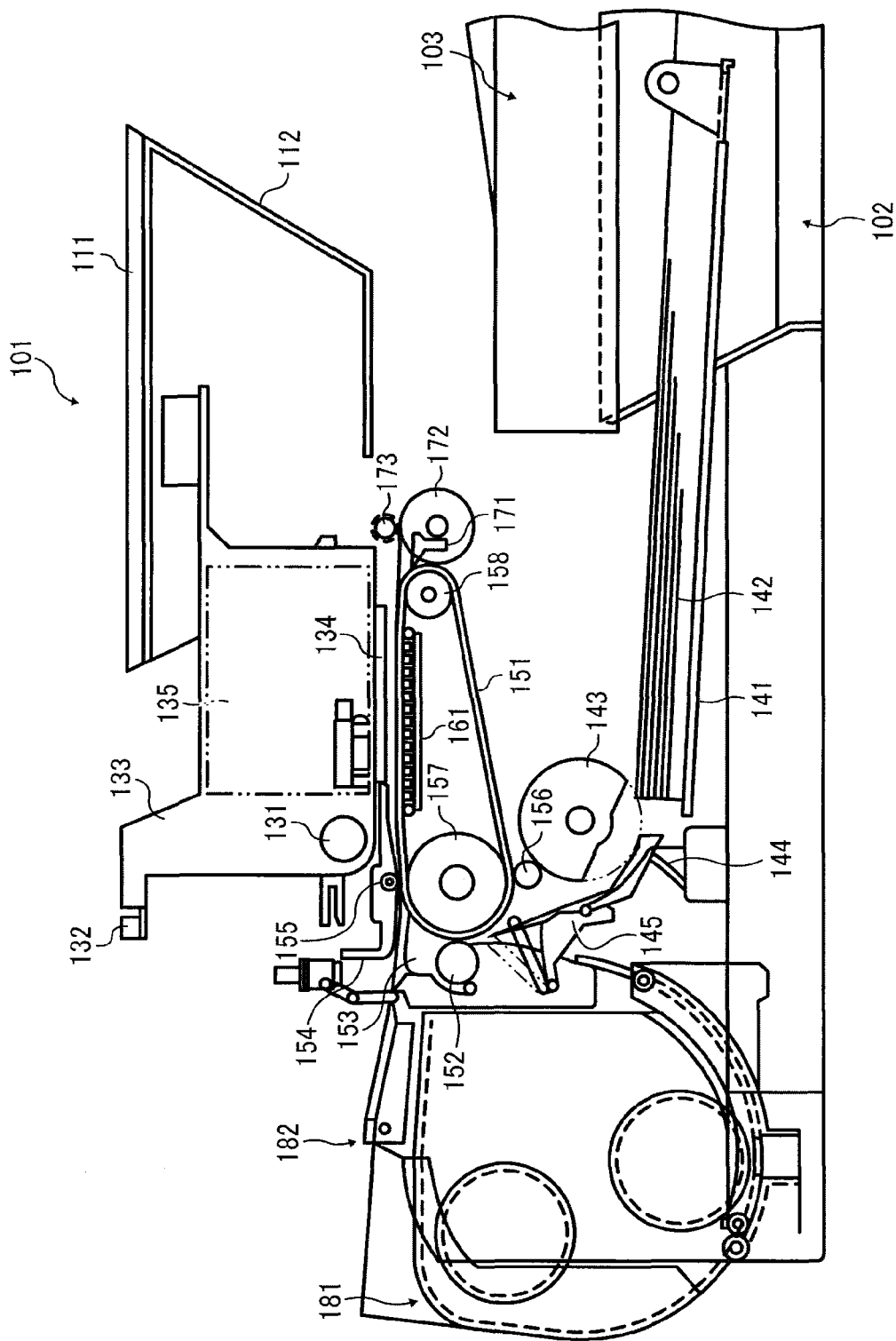
FIG. 2 is a cross sectional view illustrating the entire configuration of the ink jet recording device.

Inside the inkjet recording device 101, as illustrated in FIG. 2, a guide rod 131 and a stay 132 serving as guiding members that laterally bridge side plates provided on the right side and left side hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has a sub tank 135 for each color to supply each color ink to the recording head 134. The ink of the present disclosure is supplied and replenished to the sub-tank 135 from the ink cartridge 200 mounted onto the ink cartridge installation unit 104 via an ink supplying tube.

A sheet feeding unit to feed a recording medium (sheet) 142 loaded on a sheet loader (pressure plate) 141 of the sheet feeder tray 103 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while biased towards the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front end pressure roller 155 biased towards the transfer belt 151 by a pressure member 154, and a charging roller 156 to charge the surface of the transfer belt 151.

The transfer belt 151 is an endless form belt, stretched between a transfer roller 157 and a tension roller 158 and rotatable in the belt transfer direction.

This transfer belt 151 includes, for example, a top layer serving as a sheet adsorption surface which is made of a resin material such as a copolymer (ETFE) of tetrafluoroethylene and ethylene with no resistance treatment and has a thickness about 4 μm and a bottom layer (moderate resistance layer, earth layer) which is made of the same material as the top layer with resistance treatment with carbon.

On the rear side of the transfer belt 151, a guiding member 161 is arranged corresponding to the printing area by the recording head 134.

A discharging unit to discharge the sheet 142 on which images are recorded by the recording head 134 includes a separation claw 171 to separate the sheet 142 from the transfer belt 151, a discharging roller 172, and a discharging roller 173. A discharging tray 103 is arranged below the discharging roller 172.

A duplex printing sheet feeding unit 181 is detachably attached to the rear side of the inkjet recording device 101. The duplex printing sheet feeding unit 181 takes in and reverses the sheet 142 that is returned by the reverse rotation of the transfer belt 151 and feeds it again between the counter roller 152 and the transfer belt 151.

A manual sheet feeding unit 182 is provided on the upper surface of the duplex printing sheet feeding unit 181.

In this inkjet recording device, the sheet 142 is separated and fed from the sheet feeding unit one by one substantially vertically upward, guided by the guide 145, and transferred while being pinched between the transfer belt 151 and the counter roller 152.

Furthermore, the front end of the sheet 142 is guided by the transfer guide 153 and pressed against the transfer belt 151 by the front end pressure roller 155 to change the transfer direction by substantially 90°.

Since the transfer belt 157 is charged by the charging roller 156 at this point in time, the sheet 142 is electrostatically adsorbed to the transfer belt 151 and transferred. By driving the recording head 134 according to the image signal while moving the carriage 133, the ink droplet is discharged to the sheet 142 not in motion to record an image for an amount corresponding to one line and thereafter the sheet 142 is transferred in a predetermined amount to conduct recording for the next line.

On receiving a signal indicating that the recording has completed or the rear end of the sheet 142 has reached the image recording area, the recording operation stops and the sheet 142 is discharged to the discharging tray 103.

When the amount of ink for inkjet recording remaining in the sub-tank 135 is detected as "approaching to empty", a predetermined amount of the ink is replenished to the sub tank 135 from the ink cartridge 200.

In this inkjet recording device, it is possible to dissemble the chassis of the ink cartridge 200 and replace the ink bags therein when the ink is used up in the ink cartridge 200.

In addition, the ink cartridge 200 stably supplies the ink even when the ink cartridge 200 is placed upright (on its side) and installed by front loading.

Therefore, even when the upside of the inkjet recording device 101 is blocked, for example, it is accommodated in a rack or something is placed on the upper surface of the inkjet recording device 101, the ink cartridge 200 is easily exchanged.

A serial type (shuttle type) in which the carriage scans is used in this description but this is true in a line-type inkjet recording device having a line type head.

Ink Cartridge

The ink of the present disclosure can be accommodated in a container for an ink cartridge. The ink cartridge optionally has other members.

There is no specific limit to the container. Any form, any structure, any size, and any material can be selected. For example, an ink bag formed of aluminum laminate film, a resin film, etc. can be suitably used as a container.

Figure 3:
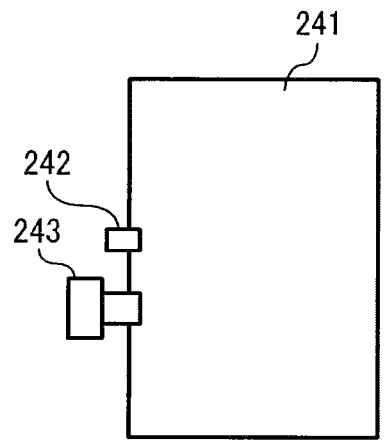
FIG. 3 is a schematic diagram illustrating an example of the ink bag of the ink cartridge according to an embodiment of the present disclosure.

FIG. 3 is a schematic diagram illustrating an example of a container (ink bag) 241 of the ink cartridge of the present disclosure.

Figure 4:
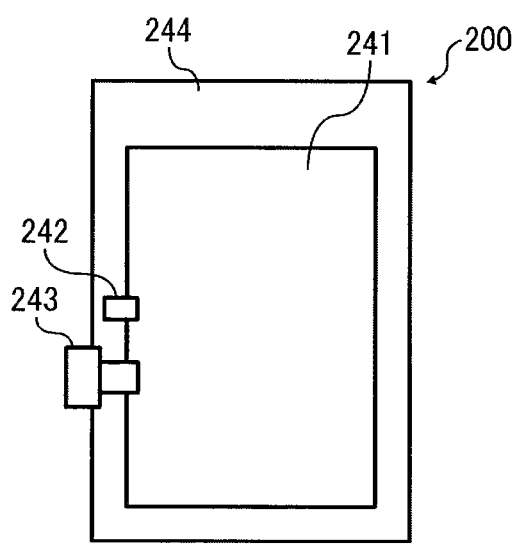
FIG. 4 is a schematic diagram illustrating an example of the ink cartridge that accommodates the ink bag illustrated in FIG. 3 in the cartridge case.

FIG. 4 is a schematic diagram illustrating the ink cartridge 200 that accommodates the ink bag 241 of FIG. 3 in a cartridge case 244.

As illustrated in FIG. 3, an ink bag 241 is filled with the ink from an ink inlet 242. Subsequent to evacuation of air, the ink inlet 242 is closed by fusion. When in use, the ink is supplied by piercing the needle provided to the inkjet recording device into an ink outlet 243 made of rubber. The inkbag 241 is typically accommodated in the cartridge case 244 made of plastic as illustrated in FIG. 4 and detachably attachable to various inkjet recording devices as the ink cartridge 200.

Having generally described preferred embodiments of this invention, further understanding can be obtained by reference to certain specific examples which are provided herein for the purpose of illustration only and are not intended to be limiting.

In the descriptions in the following examples, the numbers represent weight ratios in parts, unless otherwise specified.

EXAMPLES

Next, the present disclosure is described in detail with reference to Examples and Comparative Examples but not limited thereto.

Example 1

Manufacturing of Dispersion Element 1

Using a microreactor (ULREA, manufactured by M Technique Co., Ltd.), methanol at −20° C. was flown in a flowing amount rate of 400 ml/min. into the thin-layer reactor thereof sandwiched by rotation disks; and a solution kept at 25° C. in which 30 parts of a pigment (Hostaperm Pink E02, manufactured by Clariant Japan K.K.) represented by the Chemical formula 1-2 was dissolved in 970 parts of strong sulfuric acid was flown into the same rotation disks at a flowing amount rate of 10 ml/min. to precipitate pigment particles; The thus-obtained pigment liquid dispersion was condensed by a centrifugal and diluted with deionized water repeatedly to adjust the pH of the resultant to be around 6 to obtain a pigment paste having a pigment concentration of 30% by weight;

Thereafter, 6 parts of a dispersing agent represented by the Chemical formula 3-1 was dissolved in 44 parts of deionized water followed by mixing with 50 parts of the pigment paste prepared as described above; The thus-obtained resultant was subject to one-hour treatment by an ultrasonic homogenizer to obtain Dispersion Element 1 having a pigment concentration of 15% by weight.

<Preparation of Ink>

Manufacturing a vehicle by dissolving the following materials other than the Dispersion Element 1 in deionized water, the vehicle was mixed with the Dispersion Element 1 and the mixture was filtrated by a filter having an opening of 1 μm to obtain Ink of Example 1.

Ink Recipe

| | |
|---|---|
| Dispersion Element 1: | 40.0 parts |
| Glycerin: | 20.0 parts |
| 3-ethyl-3-hydroxymethyl oxetane: | 10.0 parts |
| N,N-dimethyl-β-methoxy propionamide | 10.0 parts |
| 2-ethyl-1,3-hexane diol: | 2.0 parts |
| Surfactant represented by the Chemical formula 4: | 0.05 parts |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 17.35 parts |

Example 2

Manufacturing of Dispersion Element 2

A pigment paste having a pigment concentration of 30% by weight was prepared in the same manner as in Example 1 except that the pigment was changed to CINQUASIA Violet R RT-101-D (manufactured by BASF Japan LTD.) represented by the Chemical formula 1-1.

Dispersion Element 2 having a pigment concentration of 15% by weight was manufactured in the same manner as in Example 1 except that the dispersing agent was changed to the dispersing agent represented by the Chemical formula 3-2.

Preparation of Ink

Manufacturing a vehicle by dissolving the following materials other than the Dispersion Element 2 in deionized water, the vehicle was mixed with the dispersion element 2 followed by filtration by a filter having an opening of 1 μm to obtain Ink of Example 2.

Ink Recipe

| | |
|---|---|
| Dispersion Element 2: | 40.0 parts |
| Glycerin: | 20.0 parts |
| 1,3-butane diol | 5.0 part |
| Isopropylidene glycerol: | 10 parts |
| N,N-dimethyl-β-butoxy propionamide: | 5.0 parts |
| 2-ethyl-1,3-hexane diol: | 2.0 parts |
| Surfactant represented by the Chemical Structure 4: | 0.05 parts |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 17.35 parts |

Example 3

Manufacturing of Dispersion Element 3

A pigment paste having a pigment concentration of 30% by weight was prepared in the same manner as in Example 1 except that the pigment was changed to CROMOPHTHAL JET MAGENTA DMQ (manufactured by BASF Japan LTD.) represented by the Chemical formula 1-2 and the flowing amount rate of the pigment solution of strong sulfuric acid flowing into the rotation disks of the microreactor (ULREA) was changed to 20 ml/min.

Dispersion Element 3 having a pigment concentration of 15% by weight was manufactured in the same manner as in Example 1 except that the dispersing agent was changed to the dispersing agent represented by the Chemical Structure 3-3 and the processing time of the ultrasonic homogenizer was changed to 30 minutes.

Preparation of Ink

Manufacturing a vehicle by dissolving the following materials other than the Dispersion Element 3 in deionized water, the vehicle was mixed with the Dispersion Element 3 followed by filtration by a filter having an opening of 1 μm to obtain Ink of Example 3.

Ink Recipe

| | |
|---|---|
| Dispersion Element 3: | 40.0 parts |
| Glycerin: | 20.0 parts |
| Ethylene glycol monobutyl ether: | 10.0 parts |
| 2-pyrolidone: | 10.0 parts |
| 2-ethyl-1,3-hexane diol: | 2.0 parts |
| EMALGEN LS-106 (polyoxyethylene polyoxypropylene alkyl ether, manufactured by KAO CORPORATION): | 1.0 part |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 16.4 parts |

Example 4

Manufacturing of Dispersion Element 4

A pigment paste having a pigment concentration of 30% by weight was prepared in the same manner as in Example 1 except that the pigment was changed to CINQUASIA Violet R RT-101-D (manufactured by BASF Japan LTD.) represented by the Chemical formula 1-1 and the flowing amount rate of the pigment solution of strong sulfuric acid flowing into the rotation disks of the microreactor (ULREA) was changed to 20 ml/min.

Thereafter, 6 parts of a styrene acrylic resin (JONCRYL® 683, manufactured by BASF Japan LTD.) was dissolved in 44 parts of 0.01 normal aqueous sodium hydroxide.

The solution was mixed with 50 parts of the pigment paste followed by treatment by an ultrasonic homogenizer for 30 minutes to obtain Dispersion Element 4 having a pigment concentration of 15% by weight.

Preparation of Ink

Manufacturing a vehicle by dissolving the following materials other than the Dispersion Element 4 having the following recipe in deionized water, the vehicle was mixed with the Dispersion Element 4 followed by filtration by a filter having an opening of 1 μm to obtain Ink of Example 4.

Ink Recipe

| | |
|---|---|
| Dispersion Element 4: | 40.0 parts |
| Glycerin: | 20.0 parts |
| 3-methyl-1,3-butane diol: | 10.0 parts |
| 1,3-butane diol: | 10.0 parts |
| 2-ethyl-1,3-hexane diol: | 2.0 parts |
| Surfactant represented by the Chemical formula 4: | 0.05 parts |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 17.35 parts |

Example 5

Manufacturing of Dispersion Element 5

A pigment paste having a pigment concentration of 30% by weight was prepared in the same manner as in Example 1 except that the flowing amount rate of the pigment solution of strong sulfuric acid flowing into the rotation disks of the microreactor (ULREA) was changed to 5 ml/min.

Dispersion Element 5 having a pigment concentration of 15% by weight was manufactured in the same manner as in Example 1 except that the dispersing agent was changed to the dispersing agent represented by the Chemical formula 2-1.

Preparation of Ink

Manufacturing a vehicle by dissolving the following materials other than Dispersion Element 5 having the following recipe in deionized water, the vehicle was mixed with the Dispersion Element 5 followed by filtration by a filter having an opening of 1 μm to obtain Ink of Example 5.

Ink Recipe

| | |
|---|---|
| Dispersion Element 5: | 40.0 parts |
| Glycerin: | 20.0 parts |
| 1,3-butane diol: | 10.0 part |
| Isopropylidene glycerol: | 5.0 parts |
| N,N-dimethyl-β-butoxy propionamide: | 5.0 parts |
| 2-ethyl-1,3-hexane diol: | 2.0 parts |
| Surfactant represented by the Chemical formula 4: | 0.05 parts |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 17.35 parts |

Example 6

Manufacturing of Dispersion Element 6

A pigment paste having a pigment concentration of 30% by weight was prepared in the same manner as in Example 1 except that the pigment was changed to Red No. 81 (manufactured by Dainichiseika Color & Chemicals Mfg. Co., Ltd.) represented by the Chemical formula 1-2 and the flowing amount rate of the pigment solution of strong sulfuric acid flowing into the rotation disks of the microreactor (ULREA) was changed to 30 ml/min.

Dispersion Element 6 having a pigment concentration of 15% by weight was manufactured in the same manner as in Example 1 except that the dispersing agent was changed to the dispersing agent represented by the Chemical formula 2-2.

Preparation of Ink

Manufacturing a vehicle by dissolving the following materials other than the dispersion element 6 in deionized water, the vehicle was mixed with the dispersion element 6 followed by filtration by a filter having an opening of 1 μm to obtain Ink of Example 6.

Ink Recipe

| | |
|---|---|
| Dispersion Element 6: | 40.0 parts |
| Glycerin: | 20.0 parts |
| 3-methyl-1,3-butane diol: | 5.0 parts |
| 3-ethyl-3-hydroxymethyl oxetane: | 10.0 parts |
| N,N-dimethyl-β-butoxy propionamide: | 5.0 parts |
| 2-ethyl-1,3-hexane diol: | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 16.4 parts |

Example 7

Manufacturing of Dispersion Element 7

Using the same pigment paste as in Example 1, a Dispersion Element 7 having a pigment concentration of 15% by weight was manufactured in the same manner as in Example 1 except that the dispersing agent was changed to the dispersing agent represented by the Chemical Structure 2-3 and the treatment time of the ultrasonic homogenizer was changed to 30 minutes.

Preparation of Ink

Manufacturing a vehicle by dissolving the following materials other than the Dispersion Element 7 having the following recipe in deionized water, the vehicle was mixed with the Dispersion Element 7 followed by filtration by a filter having an opening of 1 μm to obtain Ink of Example 7.

Ink Recipe

| | |
|---|---|
| Dispersion Element 7: | 40.0 parts |
| Glycerin: | 20 parts |
| 1,3-butane diol: | 20.0 parts |
| 2-ethyl-1,3-hexane diol: | 2.0 parts |
| Surfactant represented by the Chemical formula 4: | 0.05 parts |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 17.35 parts |

Example 8

Manufacturing of Dispersion Element 8

A pigment paste having a pigment concentration of 30% by weight was prepared in the same manner as in Example 1 except that the pigment was changed to Cinquasia Magenta RT-243-D (manufactured by BASF Japan LTD.) represented by the Chemical formula 1-3.

Dispersion Element 8 having a pigment concentration of 15% by weight was manufactured in the same manner as in Example 1 except that the dispersing agent was changed to the dispersing agent represented by the Chemical formula 2-4.

Preparation of Ink

Manufacturing a vehicle by dissolving the following materials other than Dispersion Element 8 having the following recipe in deionized water, the vehicle was mixed with the Dispersion Element 8 followed by filtration by a filter having an opening of 1 vim to obtain Ink of Example 8.

Ink Recipe

| | |
|---|---|
| Dispersion Element 8: | 40.0 parts |
| Glycerin: | 20.0 parts |
| Ethylene glycol monobutyl ether: | 10.0 parts |
| Isopropylidene glycerol: | 5.0 parts |
| N,N-dimethyl-β-butoxy propionamide: | 5.0 parts |
| 2-ethyl-1,3-hexane diol: | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.) | 0.1 parts |
| Deionized water: | 16.4 parts |

Example 9

Manufacturing of Dispersion Element 9

A pigment paste having a pigment concentration of 30% by weight was prepared in the same manner as in Example 1 except that the pigment was changed to Red No. 81 (manufactured by Dainichiseika Color & Chemicals Mfg. Co., Ltd.) represented by the Chemical formula 1-2.

A Dispersion Element 9 having a pigment concentration of 15% by weight was manufactured in the same manner as in Example 1 except that the dispersing agent was changed to the dispersing agent represented by the Chemical formula 5-1.

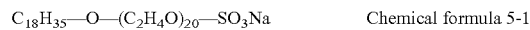

$C_{18}H_{35}-O-(C_2H_4O)_{20}-SO_3Na$      Chemical formula 5-1

Preparation of Ink

Manufacturing a vehicle by dissolving the following materials other than the Dispersion Element 9 having the following recipe in deionized water, the vehicle was mixed with the Dispersion Element 9 followed by filtration by a filter having an opening of 1 μm to obtain Ink of Example 9.

Ink Recipe

| | |
|---|---|
| Dispersion Element 9: | 40.0 parts |
| Glycerin: | 20 parts |
| Ethylene glycol monobutyl ether: | 10.0 parts |
| 2-pyrolidone: | 10.0 parts |
| 2-ethyl-1,3-hexane diol: | 2.0 parts |
| EMALGEN LS-106 (polyoxyethylene polyoxypropylene alkyl ether, manufactured by KAO CORPORATION): | 1.0 part |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 16.4 parts |

Example 10

Manufacturing of Dispersion Element 10

A pigment paste having a pigment concentration of 30% by weight was prepared in the same manner as in Example 1 except that the pigment was changed to Cinquasia Magenta RT-243-D (manufactured by BASF Japan LTD.) represented by the Chemical formula 1-3 and the flowing amount rate of the pigment solution of strong sulfuric acid flowing into the rotation disks of the microreactor (ULREA) was changed to 5 ml/min.

A Dispersion Element 10 having a pigment concentration of 15% by weight was manufactured in the same manner as in Example 1 except that the dispersing agent was changed to the dispersing agent represented by the Chemical formula 5-2.

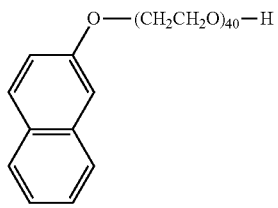

Chemical formula 5-2

Preparation of Ink

Manufacturing a vehicle by dissolving the following materials other than the Dispersion Element 10 in deionized water, the vehicle was mixed with the Dispersion Element 10 followed by filtration by a filter having an opening of 1 μm to obtain Ink of Example 10.

Ink Recipe

| | |
|---|---|
| Dispersion Element 10: | 40.0 parts |
| Glycerin: | 20.0 parts |
| 2-pyrolidone: | 5 parts |
| 1,3-butane diol: | 10.0 part |
| 3-methyl-1,3-butane diol | 5.0 parts |
| 2-ethyl-1,3-hexane diol: | 2.0 parts |
| Surfactant represented by the Chemical formula 4: | 0.05 parts |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 17.35 parts |

Example 11

Manufacturing of Dispersion Element 11

150 parts of the pigment paste obtained in Example 5 was mixed in 400 ml of sulfolane and the mixture was placed in Ultra Aspec Mill UAM 015 type (manufactured by KOTOBUKI INDUSTRIES CO., LTD.) for one-hour dispersion. Thereafter, 15 parts of amide sulfate was added followed by stirring at 140° C. to 150° C. for 10 hours. The thus-obtained slurry was placed in 1,000 ml of deionized water to obtain a pigment paste having a sulfonized surface by a centrifugal. This pigment paste was re-dispersed in 2,000 ml of deionized water followed by adjustment of the pH by lithium hydroxide. The resultant was subject to desalting concentration by an ultrafiltration membrane to obtain Dispersion Element 11 having a pigment concentration of 15% by weight.

Preparation of Ink

Manufacturing a vehicle by dissolving the following materials other than Dispersion Element 11 in deionized water, the vehicle was mixed with the Dispersion Element 11 followed by filtration by a filter having an opening of 1 μm to obtain Ink of Example 11.

Ink Recipe

| | |
|---|---|
| Dispersion Element 11: | 40.0 parts |
| Glycerin: | 20.0 parts |
| Ethylene glycol monobutyl ether: | 5.0 parts |
| 2-pyrolidone: | 5.0 parts |
| 3-methyl-1,3-butane diol: | 10.0 parts |
| 2-ethyl-1,3-hexane diol: | 2.0 parts |
| EMALGEN LS-106 (polyoxyethylene polyoxypropylene alkyl ether, manufactured by KAO CORPORATION) | 1.0 part |
| 2-amino-2-ethyl-1,3-propane diol | 0.5 parts |
| Anti-septic and anti-fungal agents (Proxel ™ LV, manufactured by ARCH CHEMICALS JAPAN, INC.): | 0.1 parts |
| Deionized water | 16.4 parts |

Example 12

Synthesis of Polymer b

After sufficient replacement with nitrogen gas in a flask equipped with a mechanical stirrer, a thermometer, a nitrogen gas introducing tube, a reflux tube, and a dripping funnel, the following Material 1 was placed therein and heated to 65° C.

Thereafter, the liquid mixture of the following material 2 was dripped into the heated flask in 2.5 hours.

Subsequent to dripping, a liquid mixture of 0.8 parts of azobis dimethyl valero nitrile and 18.0 parts of methylethyl ketone was dripped into the flask in 0.5 hours. After one-hour aging at 65° C., 0.8 parts of azobisdimethyl valeronitrile was added followed by further one-hour aging.

After completing the reaction, 364.0 parts of methylethyl ketone was added to a flask to obtain 800 parts of polymer b (vinyl resin) solution having a concentration of 50%.

Material 1 for Polymer b

| | |
|---|---|
| Styrene: | 11.2 parts |
| Acrylic acid: | 2.8 parts |
| Lauryl methacrylate: | 12.0 parts |
| Polyethylene glycol methacrylate: | 4.0 parts |
| Styrene macromer (AS-6, manufactured by TOAGOSEI CO., LTD.): | 4.0 parts |
| Mercapto ethanol: | 0.4 parts |

Material 2 for Polymer b

| | |
|---|---|
| Styrene: | 100.8 parts |
| Acrylic acid | 25.2 parts |
| Lauryl methacrylate: | 108.0 parts |
| Polyethylene glycol methacrylate: | 36.0 parts |
| Hydroxy ethyl methacrylate: | 60.0 parts |
| Styrene macromer (AS-6, manufactured by TOAGOSEI CO., LTD.): | 36.0 parts |
| Mercapto ethanol: | 3.6 parts |
| Azobis dimethyl valero nitrile: | 2.4 parts |
| Methylethylketone: | 18 parts |

Manufacturing of Dispersion Element 12

Dispersion Element 12 was manufactured from the following materials. That is, the pigment paste prepared in Example 8, polymer b solution, 1 mol-1 potassium hydroxide, and methyl ethyl ketone were mixed and sufficiently stirred followed by mixing and kneading with a three-roll mill (NR-84A, manufactured by Noritake Co., Ltd.) 20 times. The thus-obtained paste was placed in 200 parts of deionized water and subsequent to sufficient stirring, methylethyl ketone was distilled away by an evaporator to obtain Dispersion Element 12 having a pigment concentration of 15% by weight.

Recipe for Dispersion Element

| | |
|---|---|
| Pigment paste prepared in Example 8: | 50.0 parts |
| Polymer b solution: | 12.0 parts |
| 1 mol/l potassium hydroxide aqueous solution: | 14.0 parts |
| Methylethylketone: | 20.0 parts |
| Deionized water: | 200.0 parts |

Preparation of Ink

Manufacturing a vehicle by dissolving the following materials other than the Dispersion Element 12 in deionized water, the vehicle was mixed with the Dispersion Element 12 followed by filtration by a filter having an opening of 1 μm to obtain Ink of Example 12.

Ink Recipe

| | |
|---|---|
| Dispersion Element 12: | 40.0 parts |
| Glycerin: | 20.0 parts |
| 1,3-butane diol: | 10.0 part |
| 3-methyl-1,3-butane diol: | 10.0 parts |
| 2-ethyl-1,3-hexane diol: | 2.0 parts |
| EMALGEN LS-106 (polyoxyethylene polyoxypropylene alkyl ether, manufactured by KAO CORPORATION): | 1.0 part |
| 2-amino-2-ethyl-1,3-propane diol: | 0.5 parts |
| Anti-septic and anti-fungal agents (Proxel ™ LV, manufactured by ARCH CHEMICALS JAPAN, INC.): | 0.1 parts |
| Deionized water: | 16.4 parts |

Example 13

Manufacturing of Dispersion Element 13

Liquid Dispersion 13 having a pigment concentration of 15% by weight was prepared in the same manner as in Example 6 except that the flowing amount rate of the pigment solution of strong sulfuric acid flowing into the rotation disks of the microreactor (ULREA) was changed to 50 ml/min.

Preparation of Ink

Ink of Example 13 was prepared in the same manner as in Example 6 except that the Dispersion Element 6 was changed to the Dispersion Element 13.

Comparative Example 1

Manufacturing of Dispersion Element 15

6 parts of the dispersing agent represented by the chemical formula 3-2 for use in Example 2 was dissolved in 79 parts of deionized water and the solution was mixed with 15 parts of CINQUASIA Violet R RT-101-D (manufactured by BASF Japan LTD.). The mixture was placed in Ultra Aspec Mill UAM 015 type (manufactured by KOTOBUKI INDUSTRIES CO., LTD.) for one-hour dispersion followed by filtration by a filter having an opening of 1 μm to obtain Dispersion Element 15 having a pigment concentration of 15% by weight.

Preparation of Ink

Ink of Comparative Example 1 was prepared in the same manner as in Example 2 except that the Dispersion Element 2 of Example 2 was changed to the Dispersion Element 15.

Comparative Example 2

Manufacturing of Dispersion Element 16

6 parts of the dispersing agent represented by the chemical formula 5-1 for use in Example 9 was dissolved in 79 parts of deionized water and the solution was mixed with 15 parts of Pigment red No. 81 (manufactured by Dainichiseika Color & Chemicals Mfg. Co., Ltd.) for use in Example 9. The mixture was dispersed by Ultra Aspec Mill UAM 015 type (manufactured by KOTOBUKI INDUSTRIES CO., LTD.) for half an hour to obtain Dispersion Element 16 having a pigment concentration of 15% by weight.

Preparation of Ink

Ink of Comparative Example 2 was prepared in the same manner as in Example 9 except that the Dispersion Element 9 of Example 9 was changed to the Dispersion Element 16.

Comparative Example 3

Manufacturing of Dispersion Element 17

6 parts of the dispersing agent represented by the chemical formula 2-4 for use in Example 8 was dissolved in 79 parts of deionized water and the solution was mixed with 15 parts of Cinquasia Magenta RT-243-D (manufactured by BASF Japan LTD.). The mixture was placed in Ultra Aspec Mill UAM 015 type (manufactured by KOTOBUKI INDUSTRIES CO., LTD.) for one-hour dispersion to obtain Dispersion Element 17 having a pigment concentration of 15% by weight.

Preparation of Ink

Ink of Comparative Example 3 was prepared in the same manner as in Example 8 except that the Dispersion Element 8 of Example 8 was changed to the Dispersion Element 17.

Figure 5:
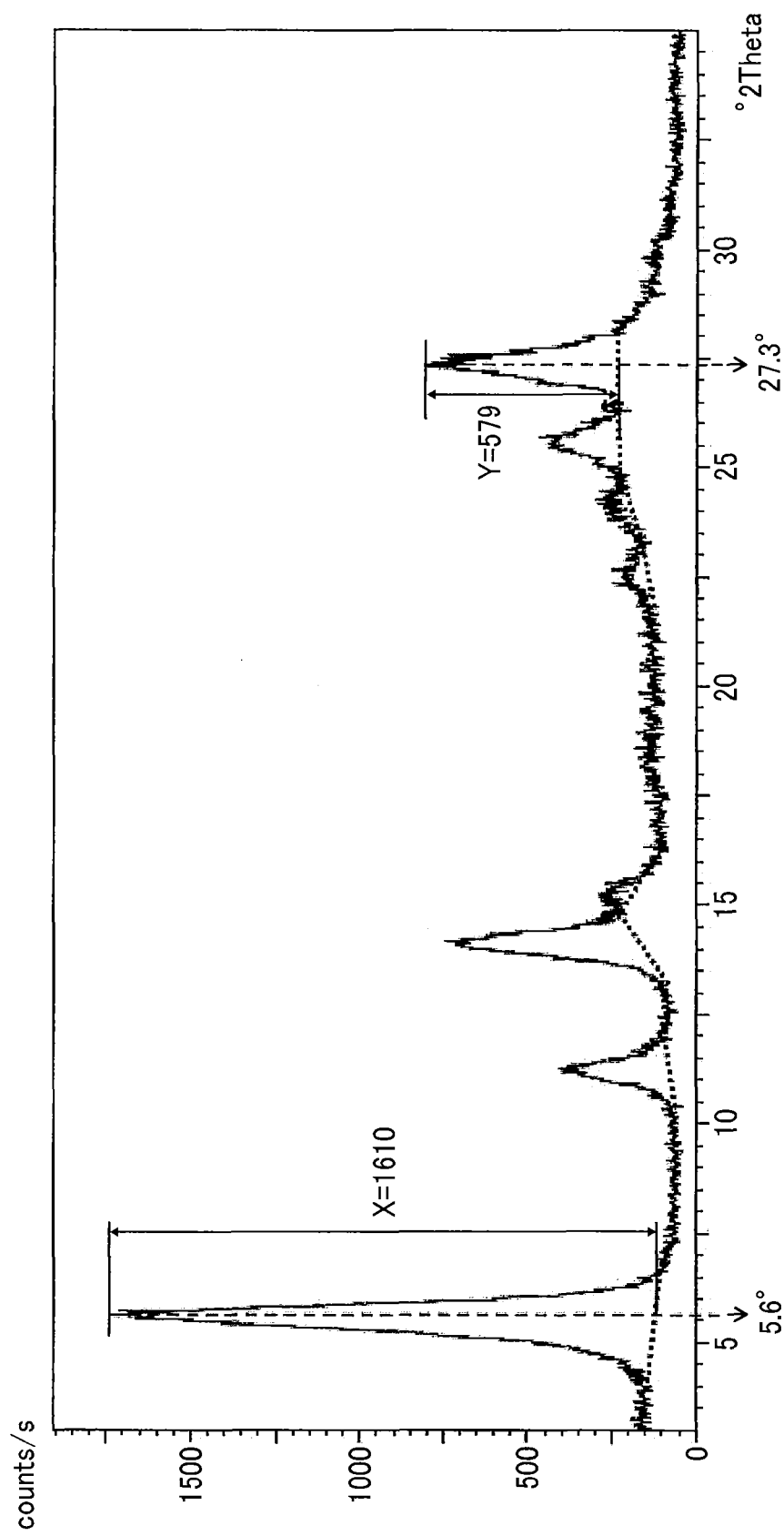
FIG. 5 is a schematic diagram illustrating how the peak intensity is obtained from X-ray diffraction spectrum of Example 3 described later.
Figure 6:
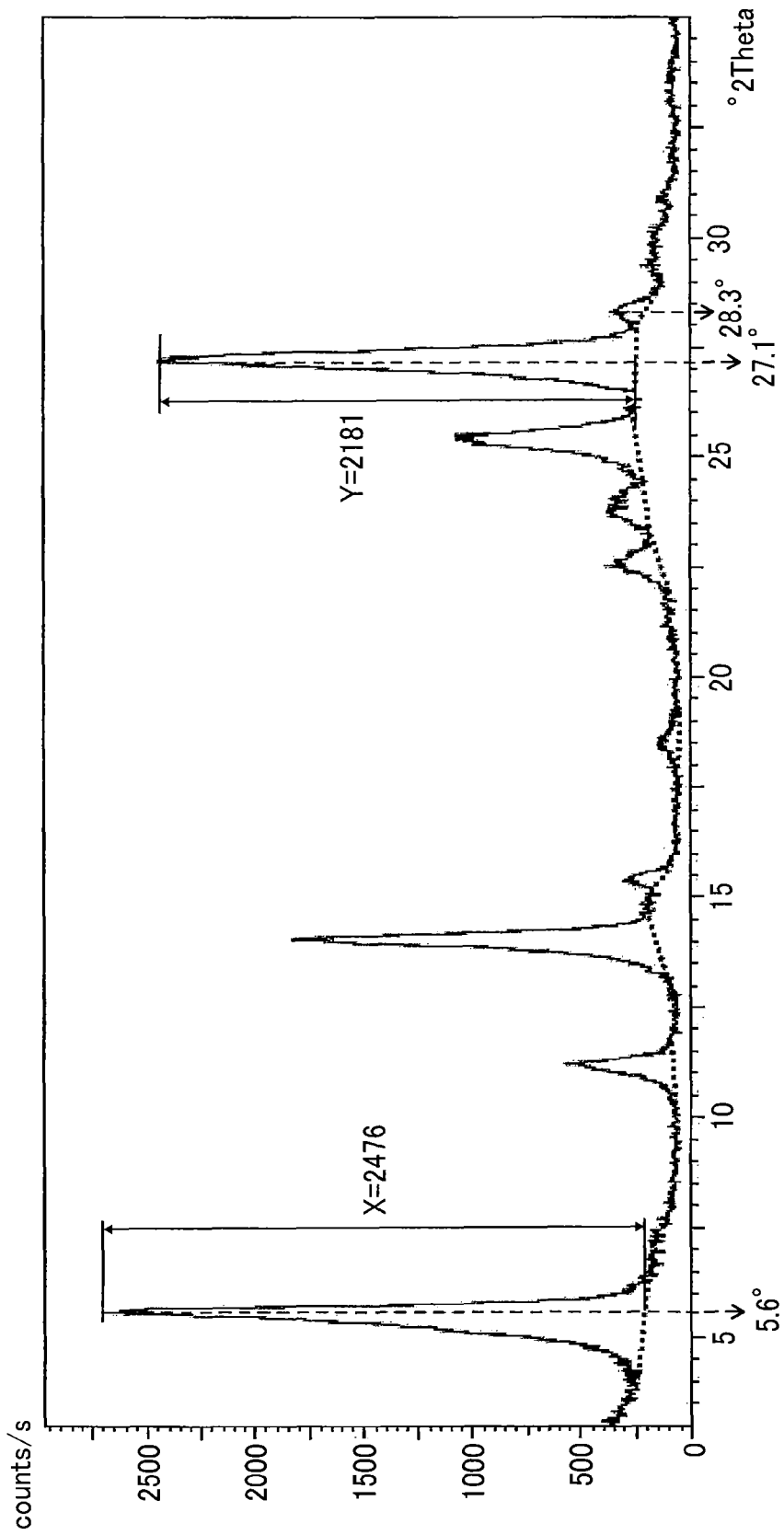
FIG. 6 is a schematic diagram illustrating how the peak intensity is obtained from X-ray diffraction spectrum of Comparative Example 2 described later.

The Dispersion Elements and the Ink prepared in Examples and Comparative Examples were measured and evaluated as follows (1) X Ray Diffraction Spectrum To measure X-ray diffraction spectra of the pigments for use in Examples and Comparative Examples, X'Pert Pro (manufactured by PANalytical Co.) was used. Using a Cu enclosure tube (Kα characteristic X-ray: wavelength of 1,541 Å) as an X-ray generator, the measuring was conducted under the conditions of a measuring range 2θ of from 3.0° to 35.0°, a sampling width of 0.02°, and a cumulative time of 1.0 second. With regard to the pigments of Examples, pigment powder prepared by removing moisture from the pigment pastes prior to dispersion with a reduced pressure while heating the pastes to 50° C. was used for measuring. With regard to the pigments of Comparative Examples, the pigment powder prior to dispersion was used for measuring. FIG. 5 is an X-ray diffraction spectrum of Example 3 and FIG. 6 is an X-ray diffraction spectrum of Comparative Example 2.

The peak in the present disclosure is determined as a peak having a maximum width of 0.5° or greater in a graph of smoothed data and a single local maximal value.

To be specific, after smoothing processing to remove noises from X-ray diffraction intensity data, a smoothing filter by a moving-average method was used to average five sets of data including the calculation target data, two sets of data therebefore, and two sets of data thereafter to replace the calculation target data if the data were digital. The smoothing processing was conducted by drawing a smooth curve that passed through the average of the noises if the data were analogue. Thereafter, a straight base line having a length of 0.5° or greater in the X axis direction was drawn in such a manner that only one peak was present on the smoothed data in the range sandwiched by both ends of the base line. If a base line satisfying this condition was drawn and a peak was present within a range of 2θ of from 28.0° to 29.0°, the peak was determined to be present. Unless otherwise, it was determined that there was no peak.

In addition, the results from the obtained X-ray diffraction spectra about whether there was a peak in a range of 2θ of from 28.0° to 29.0° and the base line width (°) are shown in Table 4. As illustrated in FIG. 5, the intensity X and Y of the peak ascribable to the crystal were obtained based on the halo portion ascribable to the non-crystal portion. The results of X, Y, and Y/X are shown in Table 4.

(2) Volume Average Particle Diameter

The volume average particle diameter of the ink was measured by UPA-EX 150, manufactured by Nikkiso Co., Ltd. The ink was diluted with deionized water to 600 times and placed in a measuring cell. The measuring was conducted at 25° C. for 60 seconds using the density of 1.40 g/ml of the pigment represented by the chemical formula 1, which was required as a measuring parameter.

The measuring results are shown in Table 5.

(3) Color Saturation

The inkjet ink was supplied to an inkjet printer IPSiO GX e5500 (manufactured by Ricoh Co., Ltd.) having a structure illustrated in FIGS. 1 and 2 and a solid image was printed with one pass.

The solid image was printed on the following recording media A, B, and C. After the images were dried, the luminance thereof was measured by a reflection type color spectrodensitometer (X-Rite 938, manufactured by X-Rite Incorporate).

Saturation C* was calculated by the relation: $C^*=\{(a^*)^2+(b^*)^2\}^{1/2}$ from the thus-obtained values a* and b*. The ratio k of the saturation value C* to the saturation value $C^*_0$ of the standard color (Japan color ver. 2) was calculated by the relation: $k=C^*/C^*_0$ and evaluated according to the following evaluation criteria. The results are shown in Table 5.

A and B of the evaluation criteria are preferable.

Sheet for Evaluation

Recording Sheet A: BP-PAPER GF-500 (A4, manufactured by Canon Inc.)

Recording Sheet B: MIRROR COAT Platinum (manufactured by OJI PAPER CO., LTD.)

Recording Sheet C: Crispia (manufactured by Seiko Epson Corp.)

Evaluation Criteria

A: k≥1.1

B: 1.1>k≥1.0

C: 1.0>k÷0.9

D: 0.9>k (4) Light Resistance

The ink was supplied to an inkjet printer IPSiO GX e5500 (manufactured by Ricoh Co., Ltd.) having a structure illustrated in FIGS. 1 and 2 and a solid image was printed with one pass. Using the following Recording Sheet C, subsequent to printing and drying, the image was irradiated by a xenon feed meter at a black panel temperature of 63° C. for 24 hours followed by measuring the change of the image density before and after the irradiation by a reflection type color spectrodensitometer (manufactured by X-Rite Incorporated) to obtain a color deterioration ratio t (%) according to the following relation. A and B are preferable.

$$t(\%)=[1-(\text{image density after irradiation})/(\text{image density before irradiation})]\times 100$$

Evaluation Sheet

Recording Sheet C: Crispia (Manufactured by Seiko Epson Corp.)

Evaluation Criteria

A: t≤5%

B: 5%<t≤10%

C: 10%<t≤20%

D: 20<t (5) Measuring of Curl

The inkjet ink was supplied to the above-described inkjet printer IPSiO GX e5500 (manufactured by Ricoh Co., Ltd.) having a structure illustrated in FIGS. 1 and 2 and a solid image was printed on the entire of an A4 sheet of the following recording sheet A with a recording density of 600 dpi×300 dpi and one pass. The attachment amount of ink was adjusted from 300 mg/A4 to 340 mg/A4 and the image obtained 10 minutes after printing was placed on a flat desk with the image face down to measure the distance between the surface of the edge of the sheet and the reference surface by a scale. The average of the measurement values at the right edge and the left edge of the sheet was determined as the amount of curl.

The evaluation results by the following criteria are shown in Table 5. A and B are preferable.

Evaluation Sheet

Recording Sheet A: BP-PAPER GF-500 (A4, Manufactured by Canon Inc.)

Evaluation Criteria

A: Less than 5 mm

B: 5 mm to less than 20 mm

C: 20 mm to less than 50 mm

D: Both edges so curled that paper has a cylinder-like form (6) Evaluation of Discharging Stability The inkjet ink manufactured in Examples and Comparative Examples was supplied to the above-described printer (IPSiO GX e5500, manufacture by RICOH CO., LTD.) having a configuration illustrated in FIGS. 1 and 2 and evaluated about the discharging stability by the following method.

Images were continuously printed for 10 minutes using the printer in which the nozzle plate was set. After leaving the printer at 50° C. and 60% RH for one month with a moisture retention cap on the head surface to which the ink was attached, the head was returned to the same state as before leaving by cleaning the head. Thereafter, an intermittent printing test was conducted under the following conditions and the discharging stability was evaluated.

That is, a printing pattern chart having a printing area of 5% for each color was continuously printed on 20 sheets and printing was halt for 20 minutes. This cycle was repeated 50 times to print the chart on 1,000 sheets in total and thereafter the printing pattern chart was printed on one more sheet, which was observed with eyes to evaluate the image with regard to streaks, white out, spraying disturbance of the 5% chart solid portion. The printing conditions were that the printing density was 600 dpi×300 dpi with one pass printing.

The evaluation criteria are as follows. The results are shown in Table 5. A and B are preferable.

Evaluation Criteria

A: No streaks, no white out, no spraying disturbance observed in the solid portion B: Slight streaks, white out, spraying disturbance observed in the solid portion C: Streaks, white out, spraying disturbance observed in the solid portion D: Streaks, white out, spraying disturbance observed all over the solid portion

TABLE 3

| Ink | Dispersion element | Hydrosoluble solvent | | | | | | | | |
|---|---|---|---|---|---|---|---|---|---|---|
| | | GLY | BGMBE | 2P | 13BD | MBD | EHO | IPG | DMPA | DBPA |
| Example 1 | 40 | 20 | | | | | 10 | | 10 | |
| Example 2 | 40 | 20 | | | 5 | | | 10 | | 5 |
| Example 3 | 40 | 20 | 10 | 10 | | | | | | |
| Example 4 | 40 | 20 | | | 10 | 10 | | | | |
| Example 5 | 40 | 20 | | | 10 | | | 5 | | 5 |
| Example 6 | 40 | 20 | | | 5 | 10 | | | | 5 |
| Example 7 | 40 | 20 | | | 20 | | | | | |
| Example 8 | 40 | 20 | 10 | | | | | 5 | 5 | |
| Example 9 | 40 | 20 | 10 | 10 | | | | | | |
| Example 10 | 40 | 20 | | 5 | 10 | 5 | | | | |
| Example 11 | 40 | 20 | 5 | 5 | | 10 | | | | |
| Example 12 | 40 | 20 | | | 10 | 10 | | | | |
| Example 13 | 40 | 20 | | | | 5 | 10 | | | 5 |
| Comparative Example 1 | 40 | 20 | | | 5 | | | 10 | | 5 |
| Comparative Example 2 | 40 | 20 | 10 | 10 | | | | | | |
| Comparative Example 3 | 40 | 20 | 10 | | | | | 5 | 5 | |

| Ink | Penetrating agent | | | pH control agent | Anti-septic and anti-fungal | Deionized water |
|---|---|---|---|---|---|---|
| | 2E13HD | LS | DSN | AEPD | agent LV | |
| Example 1 | 2 | | 0.05 | 0.5 | 0.1 | 17.35 |
| Example 2 | 2 | | 0.05 | 0.5 | 0.1 | 17.35 |
| Example 3 | 2 | 1 | | 0.5 | 0.1 | 16.40 |
| Example 4 | 2 | | 0.05 | 0.5 | 0.1 | 17.35 |
| Example 5 | 2 | | 0.05 | 0.5 | 0.1 | 17.35 |
| Example 6 | 2 | 1 | | 0.5 | 0.1 | 16.40 |
| Example 7 | 2 | | 0.05 | 0.5 | 0.1 | 17.35 |
| Example 8 | 2 | 1 | | 0.5 | 0.1 | 16.40 |
| Example 9 | 2 | 1 | | 0.5 | 0.1 | 16.40 |
| Example 10 | 2 | | 0.05 | 0.5 | 0.1 | 17.35 |
| Example 11 | 2 | 1 | | 0.5 | 0.1 | 16.40 |
| Example 12 | 2 | 1 | | 0.5 | 0.1 | 16.40 |
| Example 13 | 2 | 1 | | 0.5 | 0.1 | 16.40 |
| Comparative Example 1 | 2 | | 0.05 | 0.5 | 0.1 | 17.35 |
| Comparative Example 2 | 2 | 1 | | 0.5 | 0.1 | 16.40 |
| Comparative Example 3 | 2 | 1 | | 0.5 | 0.1 | 16.40 |

The unit of the compounds in Table 3 is parts by weight.
Abbreviations shown in Table 3 represent as follows:
GLY: glycerin
EGMBE: ethylene glycol monobutyl ether
2P: 2-pyrrolidone
13 BD: 1,3-butane diol
MBD: 3-methyl-1,3-butane diol
EHO: 3-ethyl-3-hydroxymethyl oxetane
IPG: isopropylidene glycerol
DMPA: N,N-dimethyl-β-methoxy propionamide
DBPA: N,N-dimethyl-β-butoxy propionamide
2E13HD: 2-ethyl-1,3-hexane diol
LS: EMALGEN LS-106 (polyoxyethylene polyoxypropylene alkyl ether, manufactured by KAO CORPORATION)
DSN: surfactant represented by chemical formula 4
AEPD: 2-amino-2-ethyl-1,3-propane diol
LV: Anti-septic and anti-fungal agents (Proxel™ LV, manufactured by ARCH CHEMICALS JAPAN, INC.)

TABLE 4

| | Peak ($2\theta$ = 28.° to 29.0°) | | | Peak X | | Peak Y | |
|---|---|---|---|---|---|---|---|
| | | Base line | | | | | |
| | No peak | width (°) | Y/X | $2\theta$ | X | $2\theta$ | Y |
| Example 1 | No | 0.0 | 0.518 | 5.5 | 1941 | 27.1 | 1005 |
| Example 2 | No | 0.2 | 0.463 | 5.9 | 1740 | 26.9 | 806 |
| Example 3 | No | 0.0 | 0.360 | 5.6 | 1610 | 27.3 | 579 |
| Example 4 | No | 0.3 | 0.672 | 5.8 | 1788 | 26.9 | 1201 |
| Example 5 | No | 0.0 | 0.000 | 5.5 | 1214 | — | 0 |
| Example 6 | No | 0.4 | 0.792 | 5.6 | 1812 | 27.2 | 1436 |
| Example 7 | No | 0.1 | 0.694 | 5.5 | 2001 | 27.0 | 1389 |
| Example 8 | No | 0.4 | 0.771 | 5.7 | 1360 | 27.2 | 1048 |
| Example 9 | No | 0.3 | 0.545 | 5.7 | 1742 | 27.1 | 950 |
| Example 10 | No | 0.2 | 0.197 | 5.9 | 1604 | 27.3 | 316 |
| Example 11 | No | 0.3 | 0.773 | 5.6 | 1308 | 27.0 | 1011 |
| Example 12 | No | 0.0 | 0.515 | 5.8 | 1980 | 27.3 | 1020 |
| Example 13 | No | 0.4 | 0.830 | 5.6 | 1835 | 27.2 | 1523 |

TABLE 4-continued

|  | Peak (2θ = 28.° to 29.0°) | | | | | |
|---|---|---|---|---|---|---|
|  |  | Base line | | Peak X | | Peak Y |
|  | No peak | width (°) | Y/X | 2θ | X | 2θ | Y |
| Comparative Example 1 | Yes | 0.9 | 1.024 | 5.8 | 1910 | 26.9 | 1955 |
| Comparative Example 2 | Yes | 0.8 | 0.881 | 5.6 | 2476 | 27.1 | 2181 |
| Comparative Example 3 | Yes | 0.5 | 0.806 | 5.8 | 2060 | 27.2 | 1661 |

TABLE 5

|  | Volume average particle diameter (nm) | Saturation | | | Light resistance | Curling | Discharging stability |
|---|---|---|---|---|---|---|---|
|  |  | Recording sheet A | Recording sheet B | Recording sheet C | Recording sheet C | Recording sheet A |  |
| Example 1 | 51 | A | A | A | A | A | A |
| Example 2 | 32 | A | A | A | A | A | A |
| Example 3 | 100 | A | A | A | A | B | A |
| Example 4 | 95 | A | A | A | A | B | B |
| Example 5 | 27 | B | A | A | B | A | A |
| Example 6 | 72 | A | A | A | A | A | A |
| Example 7 | 121 | A | A | B | A | B | A |
| Example 8 | 65 | A | A | A | A | A | A |
| Example 9 | 74 | B | A | A | A | A | B |
| Example 10 | 103 | A | A | B | A | B | B |
| Example 11 | 165 | A | B | B | A | B | B |
| Example 12 | 146 | A | A | A | A | B | B |
| Example 13 | 89 | B | B | B | A | A | A |
| Comparative Example 1 | 56 | B | C | D | A | A | A |
| Comparative Example 2 | 129 | B | C | C | A | B | B |
| Comparative Example 3 | 70 | C | B | C | A | A | A |

According to the present invention, inkjet ink is provided which has improved coloring property and exhibits good light resistance.

In addition, by using this ink, highly saturated images can be printed on not only plain paper but also specialized paper such as particular gloss paper and coated paper.

Having now fully described embodiments of the present invention, it will be apparent to one of ordinary skill in the art that many changes and modifications can be made thereto without departing from the spirit and scope of embodiments of the invention as set forth herein.

What is claimed is:

1. Inkjet ink comprising:
   a pigment;
   a hydrosoluble solvent;
   a dispersing agent; and
   water,
   wherein the pigment is represented by the following chemical formula 1 and has a CuKα X-ray diffraction spectrum having a wavelength of 1.541 Å such that no main peak is observed at a Bragg (2θ±0.2°) angle in a range of 2θ of from 28.0° to 29.0°

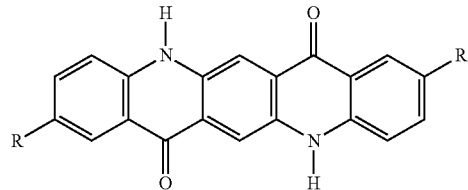

Chemical formula 1 wherein R represents a hydrogen atom, a methyl group, or a chlorine atom;

wherein the dispersing agent is represented by the following chemical formula 2:

$$A^1\text{-O-}B^1 \qquad \text{Chemical formula 2}$$

where $A^1$ represents a linear or branched alkyl group having 8 to 12 carbon atoms, a β-naphtyl group, a styrenized phenolic group, or a distyrenized phenolic group and $B^1$ represents a COOM$^1$, an SO$_3$M$^1$, or a PO$_3$M$^1{}_2$, where $M^1$ represents Na, K, tetramethyl ammonium, or ethanol amine.

2. The inkjet ink according to claim 1, wherein the pigment satisfies the following relation 1:

$$0.000 \leq Y/X \leq 0.800 \qquad \text{Relation 1}$$

where in a CuKα X-ray diffraction spectrum having a wavelength of 1.541 Å, X represents a peak intensity at a Bragg (2θ±0.2°) angle in a range of 2θ of from 5.5° to 6.0° and Y represents a peak intensity at a Bragg (2θ±0.2°) angle in a range of 2θ of from 26.5° to 27.5°.

3. The inkjet ink according to claim 1, wherein the pigment has a volume average particle diameter of from 30 nm to 150 nm.

4. The inkjet ink according to claim 1, wherein the hydrosoluble solvent is at least one of 3-ethyl-3-hydroxymethyl oxetane, isopropylidene glycerol, N,N-dimethyl-β-methoxy propionamide, and N,N-dimethyl-β-butoxy propionamide.

5. An ink cartridge comprises:
a container; and
the inkjet ink of claim 1 accommodated in the container.

6. An inkjet recording device comprises:
the ink cartridge of claim 5.

7. An inkjet printed matter comprises:
a recording medium; and
the inkjet ink of claim 1 applied to the recording medium.

8. Inkjet ink comprising:
a pigment;
a hydrosoluble solvent;
a dispersing agent; and
water,
wherein the pigment is represented by the following chemical formula 1 and has a CuKα X-ray diffraction spectrum having a wavelength of 1.541 Å such that no main peak is observed at a Bragg ($2\theta \pm 0.2°$) angle in a range of $2\theta$ of from 28.0° to 29.0°

Chemical formula 1

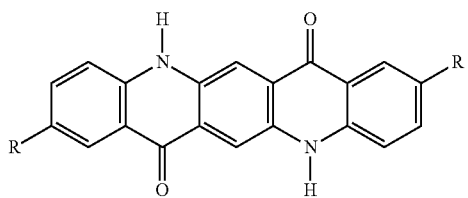

wherein R represents a hydrogen atom, a methyl group, or a chlorine atom;
wherein the dispersing agent is represented by the following chemical formula 3, Chemical formula 3

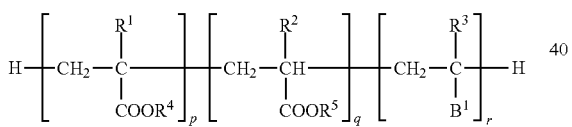

where $R^1$, $R^2$, and $R^3$ each, represent a hydrogen atom or a methyl group, $R^4$ and $R^5$ each, represent an $NH_2$ group, a benzyl group, and a stearyl group, $B^1$ represents a $COOM^1$ or an $SO_3M^1$, where $M^1$ represents Na, K, tetramethyl ammonium, or ethanol amine, and p, q, and r each, independently, represent an integer of from 5 to 50.

9. The inkjet ink according to claim 8, wherein the pigment satisfies the following relation 1:

$$0.000 \leq Y/X \leq 0.800 \quad \text{Relation 1}$$

where in a CuKα X-ray diffraction spectrum having a wavelength of 1.541 Å, X represents a peak intensity at a Bragg ($2\theta \pm 0.2°$) angle in a range of $2\theta$ of from 5.5° to 6.0° and Y represents a peak intensity at a Bragg ($2\theta \pm 0.2°$) angle in a range of $2\theta$ of from 26.5° to 27.5°.

10. The inkjet ink according to claim 8, wherein the pigment has a volume average particle diameter of from 30 nm to 150 nm.

11. The inkjet ink according to claim 8, wherein the hydrosoluble solvent is at least one of 3-ethyl-3-hydroxymethyl oxetane, isopropylidene glycerol, N,N-dimethyl-β-methoxy propionamide, and N,N-dimethyl-β-buthoxy propionamide.

12. An ink cartridge comprises:
a container; and
the inkjet ink of claim 8 accommodated in the container.

13. An inkjet recording device comprises:
the ink cartridge of claim 12.

14. An inkjet printed matter comprises:
a recording medium; and
the inkjet ink of claim 8 applied to the recording medium.

15. A method of manufacturing an inkjet ink comprising a pigment, a hydrosoluble solvent, and water, comprising:
precipitating the pigment utilizing a microreactor to provide a pigment paste; and
combining the pigment paste with the hydrosoluble solvent and water;
wherein the pigment is represented by the following chemical formula 1 and has a CuKα X-ray diffraction spectrum having a wavelength of 1.541 Å such that no main peak is observed at a Bragg ($2\theta \pm 0.2°$) angle in a range of $2\theta$ of from 28.0° to 29.0°

Chemical formula 1

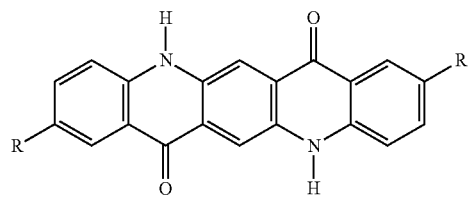

wherein R represents a hydrogen atom, a methyl group, or a chlorine atom.

* * * * *